United States Patent
Suzuki

(10) Patent No.: US 12,416,780 B2
(45) Date of Patent: Sep. 16, 2025

(54) LENS HOLDER DRIVING DEVICE

(71) Applicant: ALPS ALPINE CO., LTD., Tokyo (JP)

(72) Inventor: Katsutoshi Suzuki, Fukushima (JP)

(73) Assignee: ALPS ALPINE CO., LTD., Tokyo (JP)

( * ) Notice: Subject to any disclaimer, the term of this patent is extended or adjusted under 35 U.S.C. 154(b) by 403 days.

(21) Appl. No.: 17/933,519

(22) Filed: Sep. 20, 2022

(65) Prior Publication Data

US 2023/0100905 A1  Mar. 30, 2023

(30) Foreign Application Priority Data

Sep. 24, 2021  (JP) ................................. 2021-156049

(51) Int. Cl.
| | | |
|---|---|---|
| *G02B 7/10* | (2021.01) | |
| *G03B 3/10* | (2021.01) | |
| *G03B 30/00* | (2021.01) | |
| *G02B 13/00* | (2006.01) | |

(52) U.S. Cl.
CPC .................. *G02B 7/10* (2013.01); *G03B 3/10* (2013.01); *G03B 30/00* (2021.01); *G02B 7/102* (2013.01); *G02B 13/0065* (2013.01); *G03B 2205/0046* (2013.01); *G03B 2205/0061* (2013.01)

(58) Field of Classification Search
CPC .......... G02B 7/10; G02B 7/026; G02B 30/00; G02B 13/0065; G02B 7/102; G03B 3/10; G03B 2205/0046; G03B 2205/0061
See application file for complete search history.

(56) References Cited

U.S. PATENT DOCUMENTS

| | | | | |
|---|---|---|---|---|
| 5,587,846 | A  * | 12/1996 | Miyano | .................... G02B 7/08 |
| | | | | 310/317 |
| 7,786,648 | B2 | 8/2010 | Xu et al. | |
| 2005/0067922 | A1* | 3/2005 | Sasaki | .................... H02N 2/004 |
| | | | | 310/323.09 |
| 2005/0275314 | A1* | 12/2005 | Sasaki | .................... G02B 7/023 |
| | | | | 310/328 |

(Continued)

FOREIGN PATENT DOCUMENTS

| | | |
|---|---|---|
| JP | 2006-098580 | 4/2006 |
| JP | 2006-098593 | 4/2006 |

(Continued)

*Primary Examiner* — Bumsuk Won
*Assistant Examiner* — Alex Park Rickel
(74) *Attorney, Agent, or Firm* — IPUSA, PLLC

(57) ABSTRACT

A lens holder driving device includes a first piezoelectric driver configured to move a first lens holder along an optical-axis direction based on the movement of a first piezoelectric element and a second piezoelectric driver configured to move a second lens holder along the optical-axis direction based on the movement of a second piezoelectric element. The first lens holder includes a portion (first left-bearing portion) near a first shaft member and a portion near a second shaft member. The first piezoelectric driver is provided in the first left-bearing portion and contacts the first shaft member. The second lens holder incudes a portion near the first shaft member and a portion (second right-bearing portion) near the second shaft member. The second piezoelectric driver is provided in the second right-bearing portion and contacts the second shaft member.

11 Claims, 16 Drawing Sheets

(56) References Cited

U.S. PATENT DOCUMENTS

| | | | | |
|---|---|---|---|---|
| 2007/0064320 A1* | 3/2007 | Homme | ............... | G03B 3/10 |
| | | | | 359/824 |
| 2007/0217775 A1* | 9/2007 | Shirono | ............ | H04N 23/55 |
| | | | | 348/E5.025 |
| 2007/0229702 A1* | 10/2007 | Shirono | ........... | G02B 13/009 |
| | | | | 348/374 |
| 2008/0192363 A1* | 8/2008 | Shirono | ........... | G02B 13/009 |
| | | | | 348/E5.025 |
| 2012/0236423 A1* | 9/2012 | Uno | .................. | G02B 7/08 |
| | | | | 359/814 |
| 2012/0287328 A1* | 11/2012 | Kawai | ................. | G03B 3/10 |
| | | | | 348/E5.042 |
| 2015/0125140 A1* | 5/2015 | Ashizawa | .......... | H02N 2/163 |
| | | | | 396/125 |
| 2018/0323729 A1* | 11/2018 | Arakawa | ............ | B25J 9/0009 |
| 2020/0393637 A1* | 12/2020 | Ryoo | ................. | G02B 27/646 |
| 2021/0109307 A1* | 4/2021 | Hu | ....................... | G02B 7/10 |
| 2023/0121120 A1* | 4/2023 | Sugawara | ......... | G02B 13/009 |
| | | | | 359/824 |
| 2023/0273392 A1* | 8/2023 | Osaka | ................. | G02B 7/005 |
| | | | | 359/819 |
| 2024/0388783 A1* | 11/2024 | Kim | .................... | G03B 17/12 |

FOREIGN PATENT DOCUMENTS

| | | | | |
|---|---|---|---|---|
| JP | 2009-222876 | | 10/2009 | |
| JP | 2015-210295 | | 11/2015 | |
| JP | 2015210295 | A * | 11/2015 | |
| KR | 20120042386 | A * | 5/2012 | ............ H02N 2/02 |

* cited by examiner

LENS HOLDER DRIVING DEVICE

CROSS-REFERENCE TO RELATED APPLICATIONS

This application is based on and claims priority to Japanese Patent Application No. 2021-156049, filed on Sep. 24, 2021, the entire contents of which are incorporated herein by reference.

BACKGROUND OF THE INVENTION

1. Field of the Invention

The disclosures herein generally relate to lens holder driving devices.

2. Description of the Related Art

Conventionally, a device that uses a piezoelectric element to move a lens holder is known (see Patent Document 1).

The aforementioned device is configured such that two lens holders can be moved separately by using two piezoelectric elements.

In the aforementioned device, however, the respective actuators of the two piezoelectric elements are arranged to be in contact with the same drive shaft. Hence, when the two lens holders are moved simultaneously in the configuration, the vibration (movement) of one piezoelectric element may interfere with the vibration (movement) of the other piezoelectric element, and the movements of the two lens holders may be adversely affected.

Therefore, it would be desirable to provide a lens holder driving device that can move two lens holders stably.

RELATED-ART DOCUMENTS

Patent Documents

[Patent Document 1] Japanese Laid-Open Patent Publication No. 2006-098580

SUMMARY OF THE INVENTION

According to one embodiment of the present invention, a lens holder driving device includes a fixed member; a first lens holder configured to hold a first lens body; a second lens holder configured to hold a second lens body arranged to have a same optical axis as the first lens body; a first shaft member and a second shaft member provided in the fixed member and configured to guide the first lens holder and the second lens holder to move in an optical-axis direction with respect to the fixed member; a first piezoelectric driver including a first piezoelectric element and configured to move the first lens holder along the optical-axis direction based on movement of the first piezoelectric element; and a second piezoelectric driver including a second piezoelectric element and configured to move the second lens holder along the optical-axis direction based on movement of the second piezoelectric element. The first lens holder includes a portion near the first shaft member and a portion near the second shaft member. The first piezoelectric driver is provided in the portion near the first shaft member in the first lens holder such that the first piezoelectric driver contacts the first shaft member. The second lens holder includes a portion near the first shaft member and a portion near the second shaft member. The second piezoelectric driver is provided in the portion near the second shaft member in the second lens holder such that the second piezoelectric driver contacts the second shaft member.

BRIEF DESCRIPTION OF THE DRAWINGS

Other objects and further features of the present invention will be apparent from the following detailed description when read in conjunction with the accompanying drawings, in which.

DESCRIPTION OF THE PREFERRED EMBODIMENTS

A lens holder driving device according to the disclosure can move two lens holders more stably.

Figure 1A:
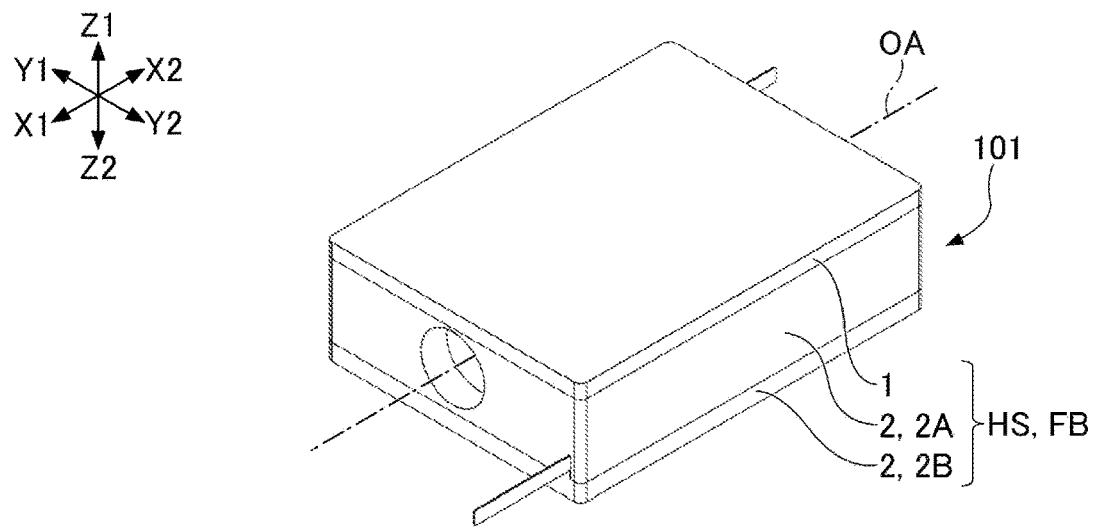
FIG. 1A is a perspective view of a lens holder driving device.
Figure 1B:
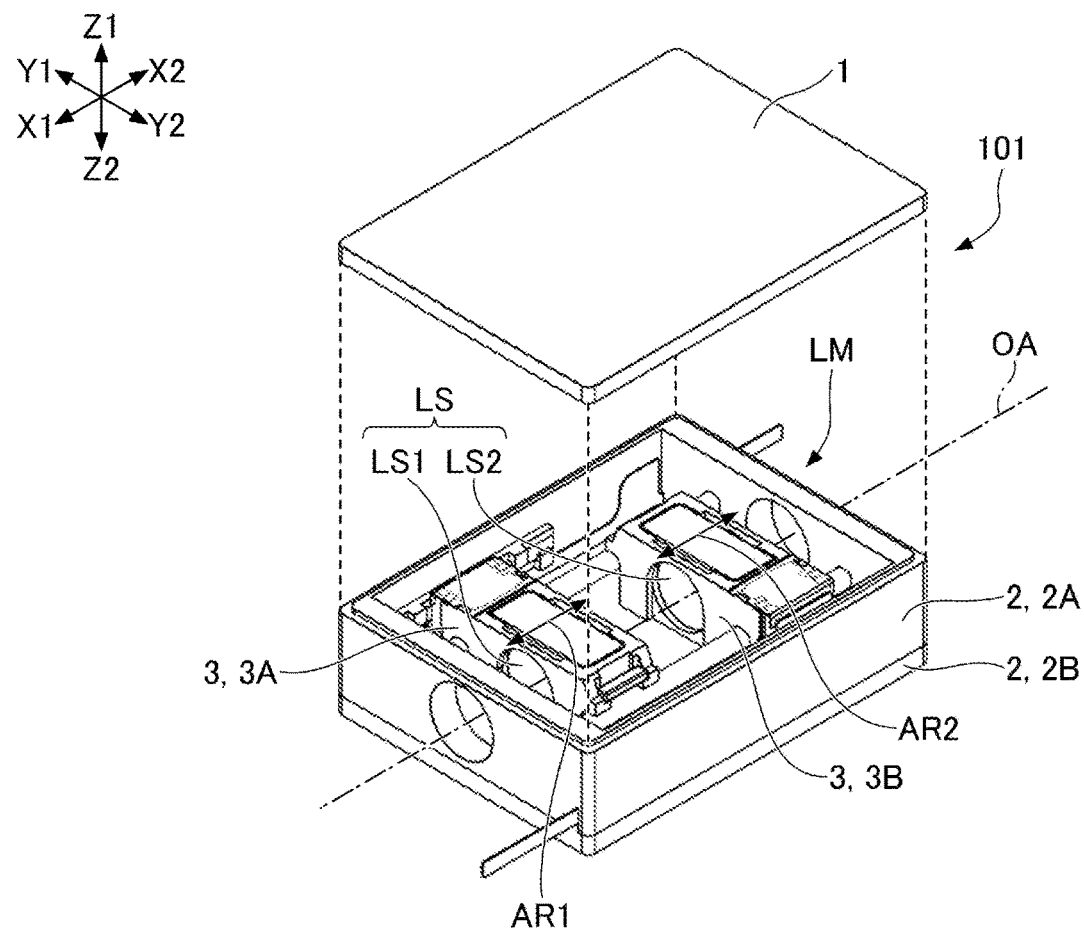
FIG. 1B is an exploded perspective view of the lens holder driving device.
Figure 2:
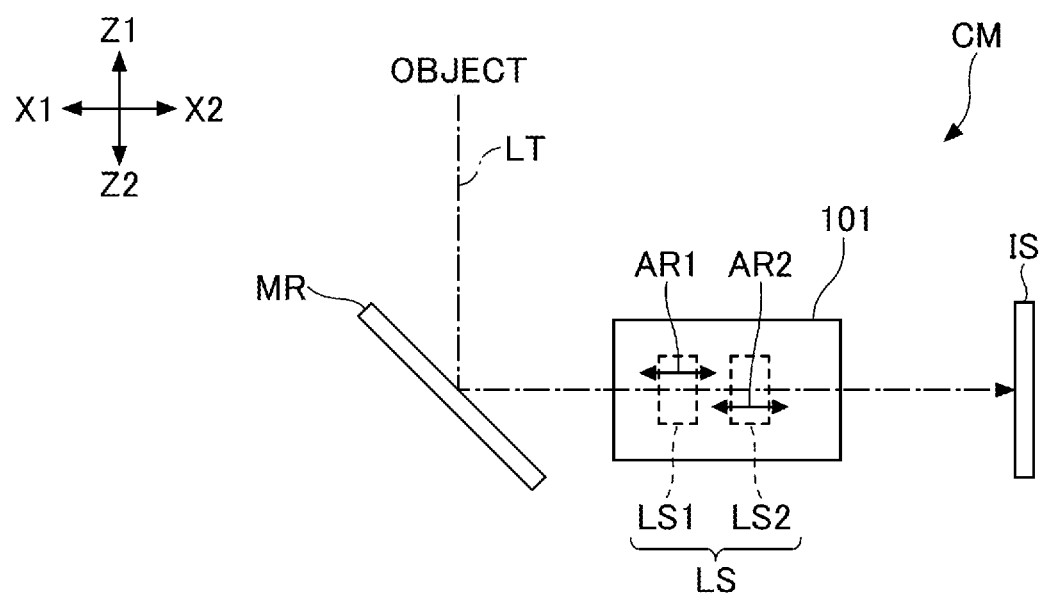
FIG. 2 is a schematic view of a camera module.

A lens holder driving device 101 according to an embodiment of the present disclosure will be described with reference to the accompanying drawings. FIG. 1A is a perspective view of the lens holder driving device 101. FIG. 1B is an exploded perspective view of the lens holder driving device 101. FIG. 2 is a schematic view of a camera module CM of a camera-equipped portable device on which the lens holder driving device 101 is mounted.

In the example illustrated in FIGS. 1A, 1B, and 2, X1 represents one direction along the X-axis constituting a three-dimensional orthogonal coordinate system and X2 represents the other direction along the X-axis. Further, Y1 represents one direction along the Y-axis constituting the three-dimensional orthogonal coordinate system, and Y2 represents the opposite direction along the Y-axis. In a similar manner, Z1 represents one direction along the Z-axis constituting the three-dimensional orthogonal coordinate system, and Z2 represents the opposite direction along the Z-axis. The X1 side of the lens holder driving device 101 corresponds to the front side (object side) of the lens holder driving device 101, and the X2 side of the lens holder driving device 101 corresponds to the rear side (image sensor side) of the lens holder driving device 101. The Y1 side of the lens holder driving device 101 corresponds to the left side of the lens holder driving device 101, and the Y2 side of the lens holder driving device 101 corresponds to the right side of the lens holder driving device 101. The Z1 side of the lens holder driving device 101 corresponds to the upper side of the lens holder driving device 101, and the Z2 side of the lens holder driving device 101 corresponds to the lower side of the lens holder driving device 101. The above-described configuration of the three-dimensional orthogonal coordinate system also applies throughout the other drawings.

The lens holder driving device 101 is configured to move a lens body LS along an optical axis OA of the lens body LS.

The lens body LS is an example of an optical member and includes one or a plurality of lenses. Typically, the lens body LS is a cylindrical lens barrel including at least one lens, and is configured such that its central axis is along the optical axis OA. As illustrated in FIG. 1B, the lens body LS includes a first lens body LS1 that forms a zoom lens and a second lens body LS2 that forms a focus lens.

The lens holder driving device 101 is formed such that the lens body LS can be moved along the optical-axis direction by piezoelectric drivers PD (see FIG. 4) housed in a housing HS. The optical-axis direction includes a direction along the optical axis OA of the lens body LS and a direction parallel to the optical axis OA. More specifically, the lens holder driving device 101 can move the first lens body LS1 along the optical-axis direction and move the second lens body LS2 along the optical-axis direction as indicated by double arrows AR1 and AR2, respectively, in FIGS. 1B and 2. That is, the lens holder driving device 101 can move the first lens body LS1 and the second lens body LS2 separately, along their respective optical-axis directions. Note that the optical axis of the first lens body LS1 and the optical axis of the second lens body LS2 are positioned to be collinear (on the optical axis OA).

The housing HS is a part of fixed members FB and includes a lid member 1 and a base member 2.

As illustrated in FIG. 2, the lens holder driving device 101 is used in the camera module CM such as a periscope camera module. In the example illustrated in FIG. 2, the camera module CM mainly includes a mirror MR, a lens body LS, a lens holder driving device 101, an image sensor IS, and the like. The mirror MR may be a prism. In the example illustrated in FIG. 2, the mirror MR is configured to provide a flat reflective surface.

Typically, as illustrated in FIG. 2, the lens holder driving device 101 is arranged at a position farther from an object than the mirror MR, and is configured such that light LT from the object reflected by the mirror MR reaches the image sensor IS through the lens body LS.

Figure 3:
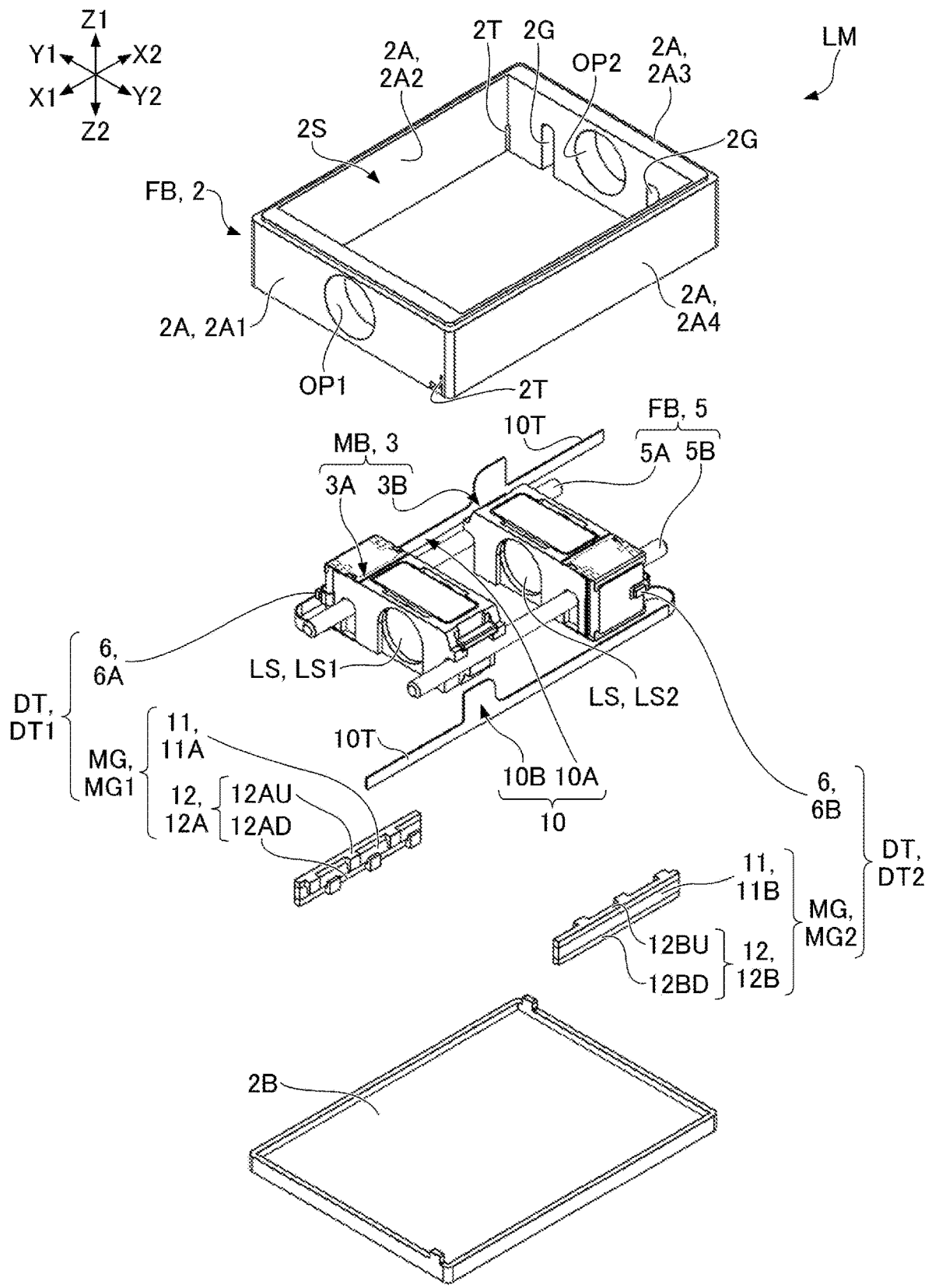
FIG. 3 is an exploded perspective view of a lower-side member.

The general outline of the lens holder driving device 101 will be described next with reference to FIGS. 1B and 3. FIG. 1B is an exploded perspective view of the lens holder driving device 101, and illustrates a state in which the lid member 1 is separated from a lower-side member LM. FIG. 3 is an exploded perspective view of the lower-side member LM, and illustrates a state in which movable members MB are separated from the fixed members FB (excluding shaft members 5). The movable members MB are configured to be moved in the optical-axis direction by the piezoelectric drivers PD while being guided by the shaft members 5.

As illustrated in FIG. 1B, the lens holder driving device 101 includes the lid member 1 and the lower-side member LM which form a part of the housing HS (the fixed members FB). The lid member 1 is configured to cover the upper surface of the lower-side member LM. In this embodiment, the lid member 1 is made of a synthetic resin material. However, the lid member 1 may be made of a non-magnetic material such as austenitic stainless steel.

The base member 2 is a member forming a part of the housing HS. In this embodiment, the base member 2 is made of a synthetic resin material similarly to the lid member 1. However, the base member 2 may be made of a non-magnetic material such as austenitic stainless steel.

More specifically, as illustrated in FIG. 3, the base member 2 is shaped like a box with a bottom. The box-shaped outer shape of the base member 2 defines a storage portion 2S. The base member 2 includes approximately rectangular-tube-shaped outer walls 2A and an approximately rectangular flat-plate-shaped bottom surface 2B, which is provided so as to be continuous with the respective lower ends (ends on the Z2 side) of the outer walls 2A. As illustrated in FIG. 3, the outer walls 2A and the bottom surface 2B are formed by separable independent members, and are integrated by using an adhesive or the like. However, the outer walls 2A and the bottom surface 2B may be formed from a single member. The outer walls 2A include a first side plate 2A1, a second side plate 2A2, a third side plate 2A3, and a fourth side plate 2A4. The first side plate 2A1 and the third side plate 2A3 oppose each other, and the second side plate 2A2 and the fourth side plate 2A4 oppose each other. The second side plate 2A2 and the fourth side plate 2A4 extend perpendicularly to the first side plate 2A1 and the third side plate 2A3. That is, the first side plate 2A1 and the third side plate 2A3 extend perpendicularly to the second side plate 2A2 and the fourth side plate 2A4. The first side plate 2A1 includes a through hole OP1 for receiving the light LT from the object reflected by the mirror MR. In a similar manner, the third side plate 2A3 includes a through hole OP2 to allow the light LT to reach the image sensor IS. The lid member 1 is joined to the base member 2 by using an adhesive, or the like, to form the housing HS together with the base member 2.

Also, as illustrated in FIG. 3, a cutout 2T through which a terminal portion 10T of each circuit board 10 may pass is formed in each of the first side plate 2A1 and the third side plate 2A3 of the base member 2. This configuration allows the terminal portion 10T of each circuit board 10 to be arranged outside of the housing HS.

The lower-side member LM includes, as illustrated in FIG. 3, lens holders 3 as the movable members MB, the base member 2 and the shaft members 5 as the fixed members FB, and position detecting mechanisms DT.

Each lens holder 3 is configured to hold the lens body LS. In FIG. 3, each lens holder 3 is formed by injection molding a synthetic resin such as a liquid crystal polymer (LCP). The lens holders 3 include a first lens holder 3A, which is configured to hold the first lens body LS1, and a second lens holder 3B, which is configured to hold the second lens body LS2. Note that the first lens holder 3A and the second lens holder 3B are the same shape and size.

Figure 4:
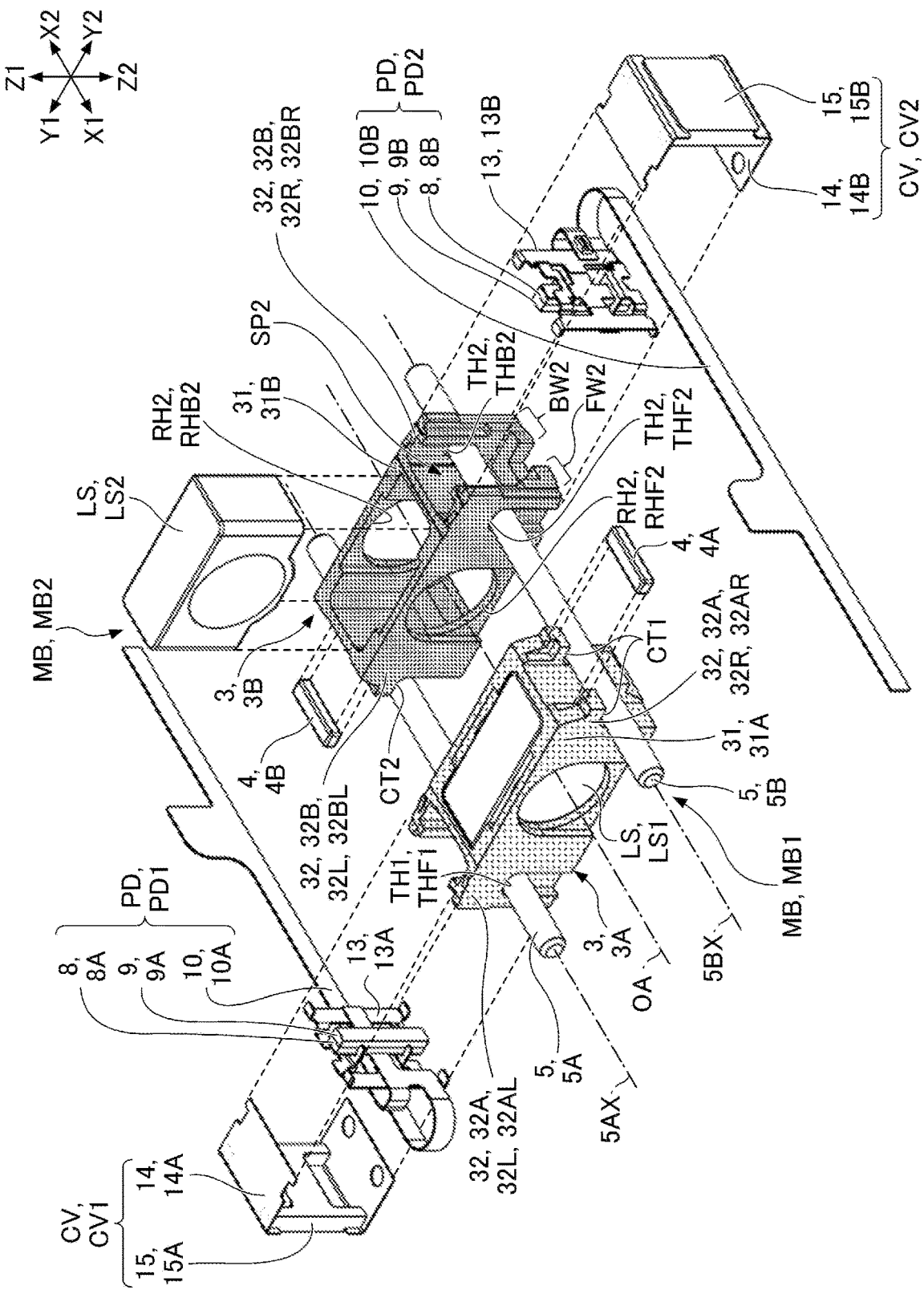
FIG. 4 is an exploded perspective view of movable members which are supported by shaft members.
Figure 5:
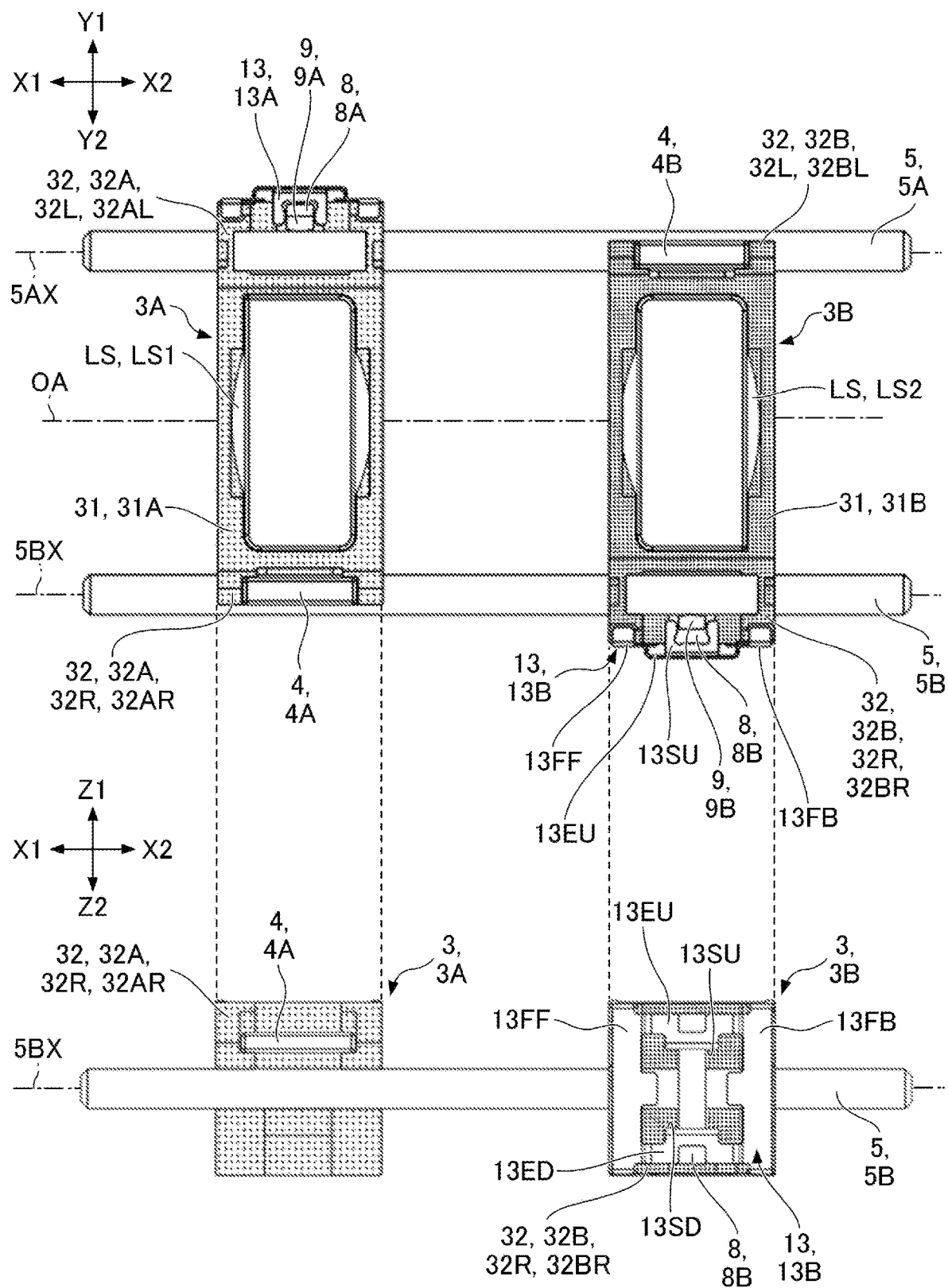
FIG. 5 is a view in which a top view of the movable members, which are supported by the shaft-members, is illustrated on the upper side and a view illustrating the right side of the movable members, which are supported by the shaft-members, is illustrated on the lower side.

The movable members MB will be described in detail with reference to FIGS. 4 and 5. FIGS. 4 and 5 are views illustrating the movable members MB supported by the shaft members 5. More specifically, FIG. 4 is an exploded perspective view in which the movable members MB are supported by the shaft members 5. A top view of the movable members MB supported by the shaft members 5 is illustrated on the upper side of FIG. 5, and a view of the right side of the movable members MB supported by the shaft members 5 is illustrated on the lower side of FIG. 5. Note that for the sake of clarity in FIGS. 4 and 5, a coarse dotted pattern has been added to the first lens holder 3A and a fine dotted pattern has been added to the second lens holder 3B. In addition, the illustration of covers CV and the circuit boards 10 have been omitted for the sake of clarity in FIG. 5.

The shaft members 5 include a first shaft member 5A whose axis (an axis 5AX) is parallel to the optical axis OA, and a second shaft member 5B whose axis (an axis 5BX) is parallel to the optical axis OA. Hence, the first shaft member 5A and the second shaft member 5B extend parallel to each other in the optical-axis direction. In FIG. 3, one end of each shaft member 5 is fitted to a corresponding one of grooves 2G formed in the third side plate 2A3 of the base member 2, and the other end of each shaft member 5 is fitted to another corresponding one of the grooves 2G (not visible in FIG. 3) formed in the first side plate 2A1 of the base member 2. However, it may be arranged such that one end of each shaft member 5 is inserted through a corresponding one of through holes (not illustrated) formed in the third side plate 2A3 of the base member 2, and the other end of each shaft member 5 is inserted through another corresponding one of through holes (not illustrated) formed in the first side plate 2A1 of the base member 2. The shaft members 5 may be fixed to the base member 2 (the third side plate 2A3 and the first side plate 2A1) with an adhesive. Note that the first shaft member 5A and the second shaft member 5B are made of magnetic metal.

Each lens holder 3 includes, as illustrated in FIG. 4, a holder 31 for holding the lens body LS and bearing portions 32 for receiving the shaft members 5. The bearing portions 32 include a left bearing portion 32L for receiving the first shaft member 5A and a right bearing portion 32R for receiving the second shaft member 5B. The bearing portions 32 function as rotation stoppers for stopping each lens holder 3 from rotating around the shaft member 5.

More specifically, the first lens holder 3A includes a first holder 31A for holding the first lens body LS1 and first bearing portions 32A for receiving the shaft members 5. The first bearing portions 32A includes the left bearing portion 32L (a first left-bearing portion 32AL) for receiving the first shaft member 5A and the right bearing portion 32R (a first right-bearing portion 32AR) for receiving the second shaft member 5B.

In a similar manner, the second lens holder 3B includes a second holder 31B for holding the second lens body LS2 and second bearing portions 32B for receiving the shaft members 5. The second bearing portions 32B include the left bearing portion 32L (a second left-bearing portion 32BL) for receiving the first shaft member 5A and the right bearing portion 32R (a second right-bearing portion 32BR) for receiving the second shaft member 5B.

More specifically, as illustrated in FIG. 4, the first left-bearing portion 32AL includes first through holes TH1 capable of receiving the first shaft member 5A. In a similar manner, as illustrated in FIG. 4, the second right-bearing portion 32BR includes a second through hole TH2 capable of receiving the second shaft member 5B.

On the other hand, as illustrated in FIG. 4, the first right-bearing portion 32AR includes a first semi-circle cutout CT1, which can receive the second shaft member 5B and opens rightward (Y2 direction). In a similar manner, as illustrated in FIG. 4, the second left-bearing portion 32BL includes a second semi-circle cutout CT2, which can receive the first shaft member 5A and opens leftward (Y1 direction).

A moving magnet 4 is attached to one of the two bearing portions 32 of each lens holder 3. The moving magnets 4, which include a first moving magnet 4A and a second moving magnet 4B, are members provided to restrict the lens holders 3 from rattling around the shaft members 5.

More specifically, as illustrated in FIG. 4, the first moving magnet 4A is attached to the first right-bearing portion 32AR of the first lens holder 3A, and the second moving magnet 4B is attached to the second left-bearing portion 32BL of the second lens holder 3B.

The first moving magnet 4A is configured such that a part of the first right-bearing portion 32AR of the first lens holder 3A can be pressed against the upper surface of the second shaft member 5B from above by using a magnetic attraction force which acts between the first moving magnet 4A and the second shaft member 5B.

The second moving magnet 4B is configured such that a part of the second left-bearing portion 32BL of the second lens holder 3B can be pressed against the upper surface of the first shaft member 5A from above by using a magnetic attraction force which acts between the second moving magnet 4B and the first shaft member 5A.

The cover CV is attached to the other of the two bearing portions 32 of each lens holder 3. That is, the cover CV is attached to the one to which the moving magnet 4 is not attached among the two bearing portions 32 of each lens holder 3.

Each cover CV is a member provided to cover the corresponding piezoelectric driver PD and includes a metal part 14 and a synthetic resin part 15. In FIG. 4, the covers CV include a first cover CV1 which is attached to the first lens holder 3A and a second cover CV2 which is attached to the second lens holder 3B.

More specifically, as illustrated in FIG. 4, the first cover CV1 is attached to the first left-bearing portion 32AL of the first lens holder 3A, and the second cover CV2 is attached to the second right-bearing portion 32BR of the second lens holder 3B. The first cover CV1 includes a first metal part 14A and a first synthetic resin part 15A, and the second cover CV2 includes a second metal part 14B and a second synthetic resin part 15B.

More specifically, the first cover CV1 is insert molded by injecting a synthetic resin into a mold in a state in which the first metal part 14A has been provided as an insert in the mold. Note that the first cover CV1 may be formed by outsert molding. Alternatively, the first cover CV1 may be integrally made of metal or synthetic resin. The second cover CV2 may also be formed in a manner similar to those described above.

Figure 6A:
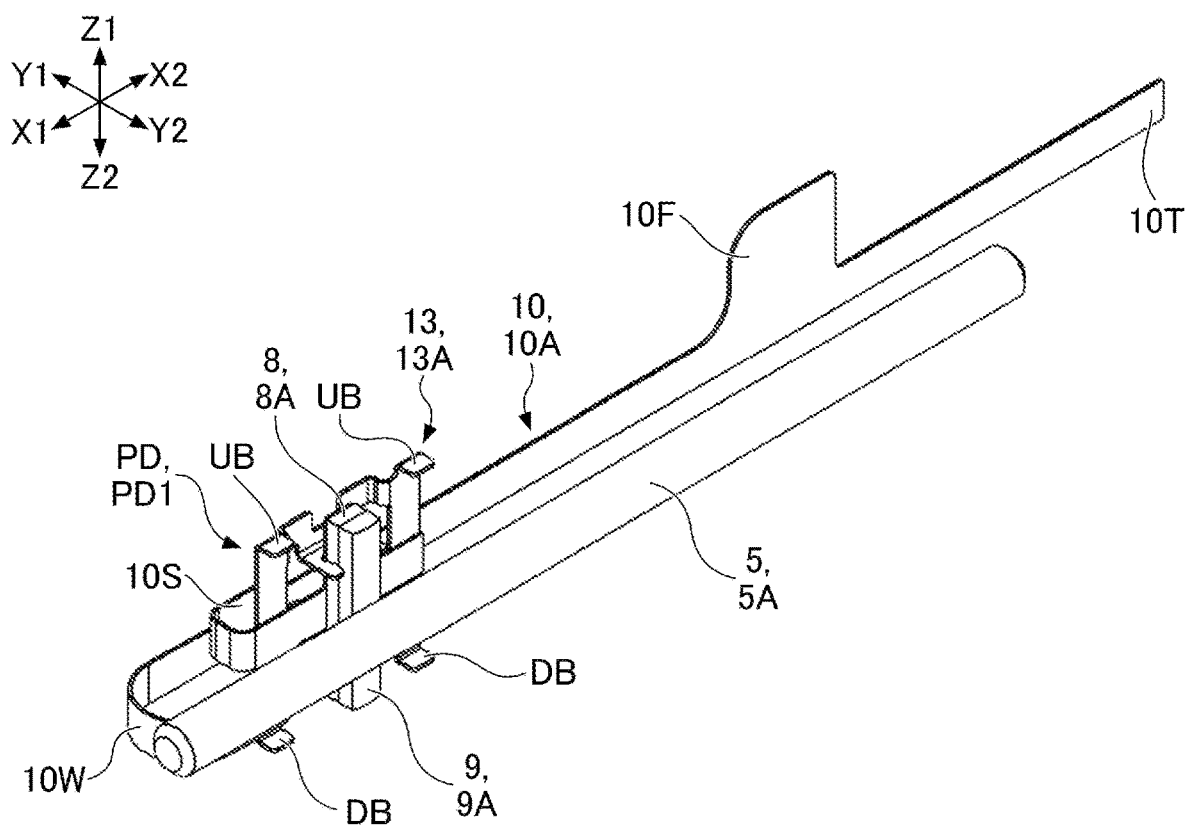
FIG. 6A is a perspective view of a piezoelectric driver pressed against the shaft member by a biasing member.
Figure 6B:
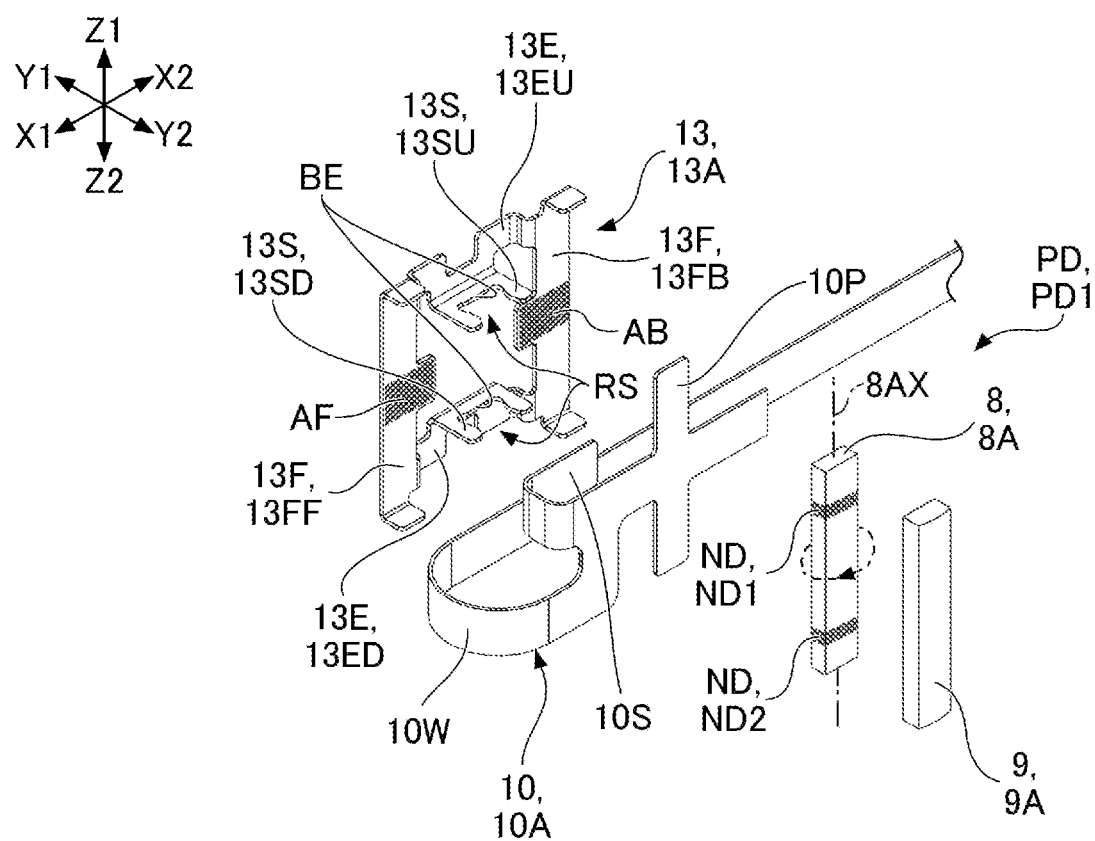
FIG. 6B is an exploded perspective view of the piezoelectric driver.

The piezoelectric driver PD will be described with reference to FIGS. 6A and 6B. FIG. 6A is a perspective view of the piezoelectric driver PD which is pressed against the shaft member 5 by a biasing member 13. FIG. 6B is an exploded perspective view of the piezoelectric driver PD.

Each piezoelectric driver PD is configured to move the corresponding lens holder 3 along the optical-axis direction. In this embodiment, each piezoelectric driver PD is an example of a friction drive using the driving system disclosed in U.S. Pat. No. 7,786,648. Each piezoelectric driver PD includes a piezoelectric element 8, a contact member 9, and the circuit board 10.

Each piezoelectric driver PD may be biased inward (in a direction closer to the optical axis OA) by the corresponding biasing member 13 fixed to the lens holder 3 such that the piezoelectric driver is pressed against the shaft member 5. As illustrated in FIGS. 6A and 6B, the biasing member 13 is made of a metal plate and includes portions (inner edge portions BE) corresponding to two nodes ND (see FIG. 6B), which are formed during the bending vibration (the circular motion to be described later) of the piezoelectric element 8. The biasing member 13 is configured such that the inner edge portions BE corresponding to the two nodes ND are brought into contact with the outer surface of the piezoelectric element 8 (the far side of the optical axis OA) via the circuit board 10. The biasing member 13 may be joined to the piezoelectric driver PD by using, for example, an adhesive.

In the example as illustrated in FIG. 4, the piezoelectric drivers PD include a first piezoelectric driver PD1 configured to cause the first lens holder 3A to move along the optical-axis direction and a second piezoelectric driver PD2 configured to cause the second lens holder 3B to move along the optical-axis direction. The first piezoelectric driver PD1 includes a first piezoelectric element 8A, a first contact member 9A, and a first circuit board 10A. The second piezoelectric driver PD2 includes a second piezoelectric element 8B, a second contact member 9B, and a second circuit board 10B.

The biasing members 13 include a first biasing member 13A, which is arranged so as to press the first piezoelectric driver PD1 against the first shaft member 5A, and a second biasing member 13B, which is arranged so as to press the second piezoelectric driver PD2 against the second shaft member 5B.

FIGS. 6A and 6B each illustrate the first piezoelectric driver PD1 that is pressed against the first shaft member 5A by the first biasing member 13A. However, the description to be given hereinafter with reference to FIGS. 6A and 6B is also similarly applicable to the second piezoelectric driver PD2 which is pressed against the second shaft member 5B by the second biasing member 13B. This is because the first piezoelectric driver PD1 and the second piezoelectric driver PD2 have the same configuration.

As illustrated in FIGS. 6A and 6B, the first piezoelectric element 8A extends in the Z-axis direction that is a direction perpendicular to the optical-axis direction (X-axis direction). That is, the first piezoelectric element 8A extends in the Z-axis direction that is a direction perpendicular to the optical axis OA. The first piezoelectric element 8A is configured to implement a bending vibration (circular motion) having the two nodes ND. More specifically, the first piezoelectric element 8A has a two-layer structure including a first layer for implementing a first bending vibration on the X-Z plane and a second layer for implementing a second vibration on the Y-Z plane. When a voltage is applied to a piezoelectric element forming the first layer and a voltage is applied to a piezoelectric element forming the second layer at individual appropriate timings, the first piezoelectric driver PD1 can cause the first piezoelectric element 8A to bend and vibrate (that is, to move in a circular motion) such that a path drawn by the midpoint of the first piezoelectric element 8A is a circular path centered about a rotation axis 8AX in the top view. That is, the first piezoelectric element 8A can move (that is, in a circular motion) such that its midpoint draws a circle. Note that the rotation axis 8AX is parallel to the Z-axis in the example illustrated in FIG. 6B. In addition, applying voltages at appropriate timings allows the first piezoelectric driver PD1 to switch the direction of movement (direction of rotation) of the midpoint on the circular path between a clockwise direction and a counterclockwise direction when viewed from the Z1 side. That is, the first piezoelectric driver PD1 can switch the direction of movement of the first lens holder 3A along the optical-axis direction. Note that the circle (circular path) drawn by the midpoint of the first piezoelectric element 8A need not be a perfect circle, but suffices to be an approximately circular shape.

In FIG. 6B, a dotted arrow drawn around the first piezoelectric element 8A represents the bending vibration of the first piezoelectric element 8A. That is, the dotted arrow indicates the circular motion in which the first piezoelectric element 8A rotates, while bending, in a clockwise direction about the rotation axis 8AX. In this case, the first piezoelectric driver PD1 that includes the first contact member 9A, which contacts the first shaft member 5A, can move rearward (in the X2 direction). Although not indicated by the dotted arrow, the first piezoelectric element 8A can also rotate, while bending, in a counterclockwise direction about the rotation axis 8AX. In this case, the first piezoelectric driver PD1 that includes the first contact member 9A, which contacts the first shaft member 5A, can move forward (in the X1 direction).

That is, the first lens holder 3A to which the first piezoelectric driver PD1 is attached is moved rearward (in the X2 direction) when the rotational direction of the midpoint of the first piezoelectric element 8A is clockwise in the top view, and is moved forward (in the X1 direction) when the rotational direction of the midpoint of the first piezoelectric element 8A is counterclockwise. Note that as illustrated in FIG. 6B, the midpoint of the first piezoelectric element 8A is a point (a point corresponding to the antinode of the first bending vibration) where the first bending vibration reaches its maximum amplitude, and a point (a point corresponding to the antinode of the second bending vibration) where the second bending vibration reaches its maximum amplitude.

The first contact member 9A is attached to the first piezoelectric element 8A and is configured to be in contact with the first shaft member 5A. In FIG. 6A, the first contact member 9A is adhered to a surface on the inner side of the first piezoelectric element 8A with an adhesive so as to cover the entire surface on the inner side (the Y2 side opposing the optical axis OA) of the first piezoelectric element 8A. The first contact member 9A is made of a metal such as stainless steel, and is formed to have an appropriate thickness that can allow a bending vibration (circular motion) to occur in accordance with the bending vibration (circular motion) of the first piezoelectric element 8A. In FIGS. 6A and 6B, the first contact member 9A is a friction plate made of stainless steel. The first contact member 9A extends in the Z-axis direction which is the same direction as the direction in which the first piezoelectric element 8A extends. The first contact member 9A is formed such that the outer surface (the surface on the Y2 side) of its center portion comes into contact with the first shaft member 5A. More specifically, the first contact member 9A is configured such that the portion (portion corresponding to the antinode of the bending vibration) where the bending vibration (circular motion) reaches its maximum amplitude comes into contact with the first shaft member 5A. In addition, the first contact member 9A has a curved surface (cylindrical shaped surface) on the side (Y2 side) which comes into contact with the first shaft member 5A. The first shaft member 5A is typically made of a metal such as stainless steel. In FIG. 6A, the first shaft member 5A is a stainless-steel cylindrical rod member that extends in the optical-axis direction. Note that as long as the first contact member 9A and the first shaft member 5A are brought into contact with each other, the length of the first contact member 9A in the Z-axis direction may differ from the length of the first piezoelectric element 8A in the Z-axis direction. As illustrated in FIGS. 6A and 6B, the length of the first contact member 9A in the Z-axis direction may be approximately the same as the length of the first piezoelectric element 8A in the Z-axis direction.

The first circuit board 10A is a substrate including a conductive pattern, and is configured to electrically couple the first piezoelectric element 8A to an external power supply. In FIGS. 6A and 6B, the first circuit board 10A is a flexible printed circuit board, and includes a bonding portion 10F, a sensor fixing portion 10S, a piezoelectric element fixing portion 10P, and a curved portion 10W.

As illustrated in FIG. 6A, the outer-side (Y1-side) surface of the bonding portion 10F of the first circuit board 10A is fixed to the inner-side (Y2-side) surface of the second side plate 2A2 of the base member 2 with an adhesive. The first circuit board 10A is configured to deform in accordance with the movement of the first lens holder 3A in the optical-axis direction, and to apply a voltage to the first piezoelectric element 8A while moving the position of the curved portion 10W in accordance with the deformation. More specifically, the curved portion 10W moves rearward as the first lens holder 3A moves rearward (X2 direction), and moves forward as the first lens holder 3A moves forward (X1 direction). Furthermore, the first circuit board 10A is configured such that the inner-side (Y2-side) surface of the piezoelectric element fixing portion 10P is bonded to the first piezoelectric element 8A by an anisotropic conductive adhesive, an anisotropic conductive adhesive film, or the like. The first circuit board 10A is folded back on the front side of the sensor fixing portion 10S such that the sensor fixing portion 10S is positioned outside of (Y1 side) of the first biasing member 13A. The first circuit board 10A is configured such that a first magnetic sensor 6A (a magnetic sensor 6) (See FIG. 3) is mounted on the outer-side (Y1-side) surface of the sensor fixing portion 10S. Note that the inner-side (Y2-side) surface of the sensor fixing portion 10S is fixed to the outer-side (Y1-side) surface of the first cover CV1 with an adhesive (See FIGS. 8A and 8B).

As illustrated in FIGS. 6A and 6B, the biasing member 13 is formed by a flat spring member. More specifically, as illustrated in FIG. 6B, the first biasing member 13A includes fixing portions 13F which are fixed to the first left-bearing portion 32AL of the first lens holder 3A, support portions 13S which support the first piezoelectric driver PD1, and elastic deforming portions 13E which are provided between the fixing portions 13F and the support portions 13S and are capable of being elastically deformed. The first biasing member 13A is fixed to the first left-bearing portion 32AL via the fixing portions 13F such that the support portions 13S and the elastic deforming portions 13E do not come into contact with the first left-bearing portion 32AL. Although the following description referring to FIG. 6B is given for the first biasing member 13A, the following description is also applicable to the second biasing member 13B. This is because the second biasing member 13B is the same shape and size as the first biasing member 13A.

More specifically, the fixing portions 13F include a front fixing portion 13FF and a rear fixing portion 13FB, and the support portions 13S include an upper support portion 13SU and a lower support portion 13SD. The elastic deforming portions 13E includes an upper elastic deforming portion 13EU and a lower elastic deforming portion 13ED provided between the rear fixing portion 13FB and the front fixing portion 13FF. The front fixing portion 13FF and the rear fixing portion 13FB are the same shape and size. The upper support portion 13SU and the lower support portion 13SD are the same shape and size. The upper elastic deforming portion 13EU and the lower elastic deforming portion 13ED are the same shape and size. That is, the first biasing member 13A is arranged to be plane-symmetrical to a plane of symmetry (a plane dividing the first biasing member 13A into front and rear halves) that is parallel to the Y-Z plane. In addition, the biasing member 13A is arranged to be plane-symmetrical to another plane of symmetry (a plane dividing the first biasing member 13A into upper and lower halves) that is parallel to the X-Y plane. The second biasing member 13B is also arranged to have plane symmetries in a similar manner.

Each support portion 13S is bent in an L-shape from the corresponding elastic deforming portion 13E and protrudes to the side (Y2 side) on which the lens holder 3 is positioned. A recessed portion RS is formed at the distal end of each support portion 13S. The recessed portion RS is a recessed portion with an opening on the side (Y2 side) on which the first lens holder 3A is positioned. More specifically, the recessed portions RS are formed to be the same shape and size at the respective distal ends of the upper support portion 13SU and the lower support portion 13SD. As illustrated in FIG. 6A, parts of the first piezoelectric driver PD1 are arranged inside the recessed portions RS and are fixed to the support portions 13S with an adhesive while in contact with the respective inner edges BE of the recessed portions RS.

More specifically, as illustrated in FIG. 6B, each recessed portion RS includes a front edge and a rear edge which oppose each other and have the inner edge BE interposed therebetween. The first piezoelectric driver PD1 is arranged between the front edge and the rear edge as illustrated in FIG. 6A.

The respective positions where the inner edges BE of the recessed portions RS come into contact with the first piezoelectric driver PD1 correspond to the respective positions of the nodes ND of the first piezoelectric element 8A which implement the bending vibration (circular motion). The positions of the nodes ND include the position of a first node ND1 and the position of a second node ND2. For the sake of clarity, a cross-hatched pattern has been added to the positions of the nodes ND in FIG. 6B.

Each position (the position of each node ND) where the first piezoelectric driver PD1 comes into contact with the inner edge portion BE of the recessed portion RS corresponds to a position at a predetermined distance from the end portion of the first piezoelectric driving portion PD1. The predetermined distance is, for example, approximately ¼ of the total length of the piezoelectric driver PD.

The first piezoelectric driver PD1 is fixed to the support portions 13S with an adhesive. More specifically, the first piezoelectric driver PD1 (the first circuit board 10A) and each support portion 13S are fixed to each other at the inner edge BE of the corresponding recessed portion RS with an adhesive. The first circuit board 10A of the first piezoelectric driver PD1 and the first biasing member 13A are fixed to each other at a contact portion AF of the front fixing portion 13FF and a contact portion AB of the rear fixing portion 13FB with an adhesive. In FIGS. 6A and 6B, the adhesive may be a UV-cured adhesive. However, the adhesive may be another type of adhesive such as a moisture-cured adhesive or a heat-cure adhesive.

As illustrated in FIG. 6B, each elastic deforming portion 13E includes a portion extending forward (in the X1 direction) from the corresponding support portion 13S and a portion extending rearward (in the X2 direction) from the corresponding support portion 13S. More specifically, the upper elastic deforming portion 13EU includes a portion extending forward from the upper support portion 13SU and a portion extending rearward from the upper support portion 13SU, and the lower elastic deforming portion 13ED includes a portion extending forward from the lower support portion 13SD and a portion extending rearward from the lower support portion 13SD. Furthermore, the direction in which each elastic deforming portion 13E extends is along the optical-axis direction.

Figure 7:
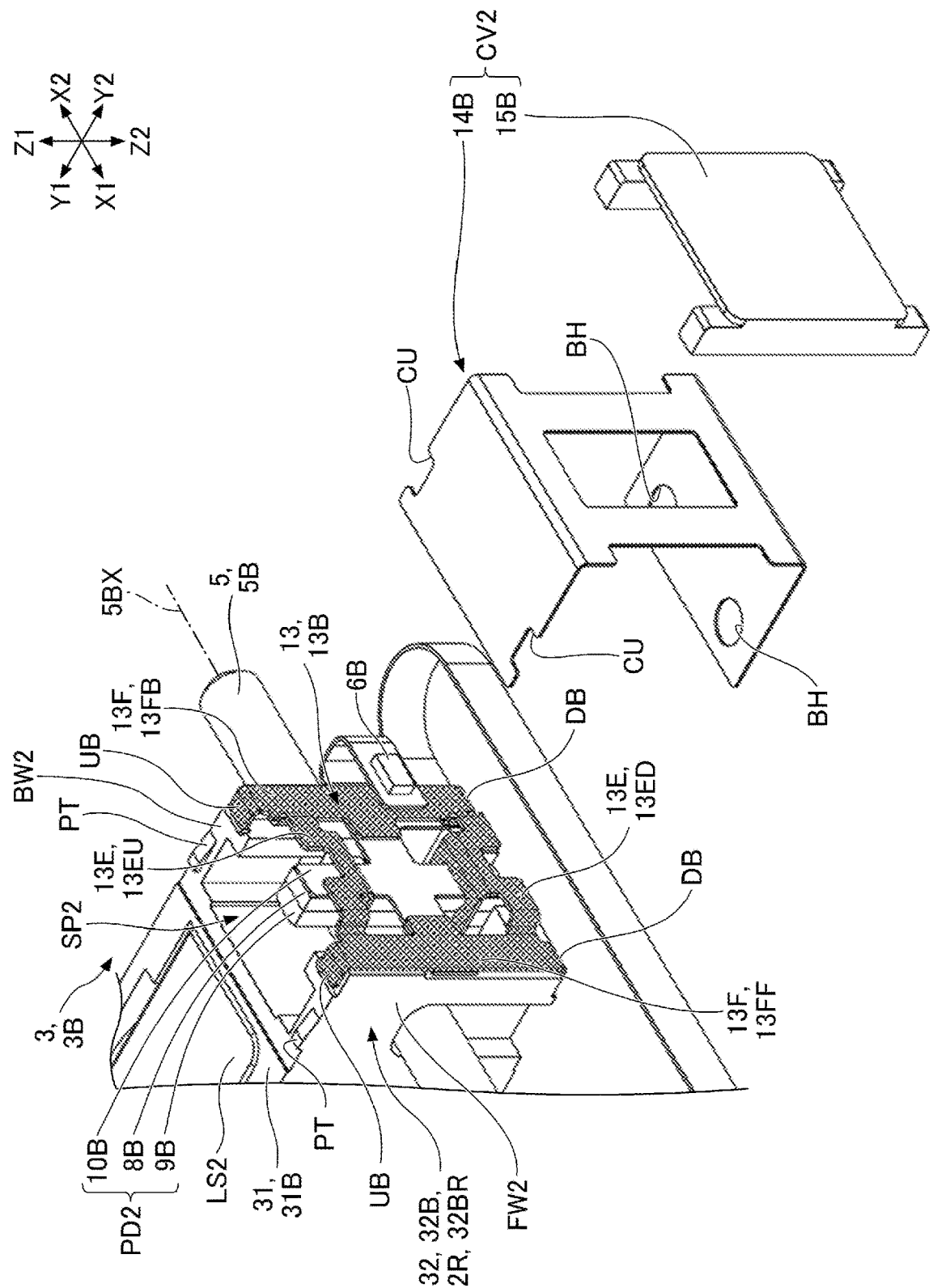
FIG. 7 is a perspective view of the biasing member attached to a lens holder.

The fixing portions 13F are provided at both ends of elastic deforming portions 13E. As illustrated in FIG. 7, the fixing portions 13F are attached so as to enclose the upper ends and the lower ends of the bearing portion 32 (the second right-bearing portion 32BR) of the lens holder 3 (the second lens holder 3B).

FIG. 7 is a perspective view of the biasing member 13 attached to the lens holder 3. More specifically, FIG. 7 is a perspective view of the second biasing member 13B attached to the second lens holder 3B. The description to be given hereinafter with reference to FIG. 7 is similarly applicable to the first biasing member 13A which is attached to the first lens holder 3A. This is because the first biasing member 13A and the second biasing member 13B have the same configuration. Note that for the sake of clarity, a cross-hatched pattern has been added to the biasing member 13 (the second biasing member 13B) in FIG. 7.

In the example illustrated in FIG. 7, the fixing portions 13F of the second biasing member 13B include the rear fixing portion 13FB and the front fixing portion 13FF. The rear fixing portion 13FB and the front fixing portion 13FF each include an upper bended portion UB and a lower bended portion DB (see also FIG. 6A). The second biasing member 13B is formed such that the right end portions of the second bearing portion 32BR of the second lens holder 3B can be enclosed by the pair of upper bended portions UB and the pair of lower bended portions DB. Note that the second biasing member 13B may be fixed to the second right-bearing portion 32BR with an adhesive or may be reinforced with an adhesive.

The second biasing member 13B which is fixed to the right end (the end on the Y2 side) of the second right-bearing portion 32BR of the second lens holder 3B is covered by the second cover CV2. The second piezoelectric driver PD2 which is fixed to the inner side (the Y1 side) of the second biasing member 13B is arranged in a second space SP2 between a second front wall portion FW2 and a second rear wall portion BW2 of the second right-bearing portion 32BR. The second space SP2 is sealed by the second cover CV2.

In FIG. 7, the second cover CV2 is fixed to the second right-bearing portion 32BR by fitting rectangular protrusions PT, which are formed on the upper end portions of the second right-bearing portion 32BR, into cutouts CU, which are formed on an upper plate portion of the second metal part 14B. Furthermore, round protrusions (not visible in FIG. 7), which are formed on the lower end portions of the second right-bearing portion 32BR, are fitted into round holes BH which are formed on the lower plate portion of the second metal part 14B. This configuration is similarly applicable to the first cover CV1.

In this configuration, the piezoelectric driver PD can be housed in a space sealed by the lens holder 3 and the cover CV. Hence, this configuration can prevent debris that is generated due the contact between the shaft member 5 and the contact member 9 from escaping outside of the sealed space. Consequently, the debris can be prevented from reaching the image sensor IS. Note that the second cover CV2 suffices to seal the second space SP2 such that debris is prevented from escaping outside of the second space SP2, and need only seal the space to an extent that allows air to flow in and out from the space.

Figure 8A:
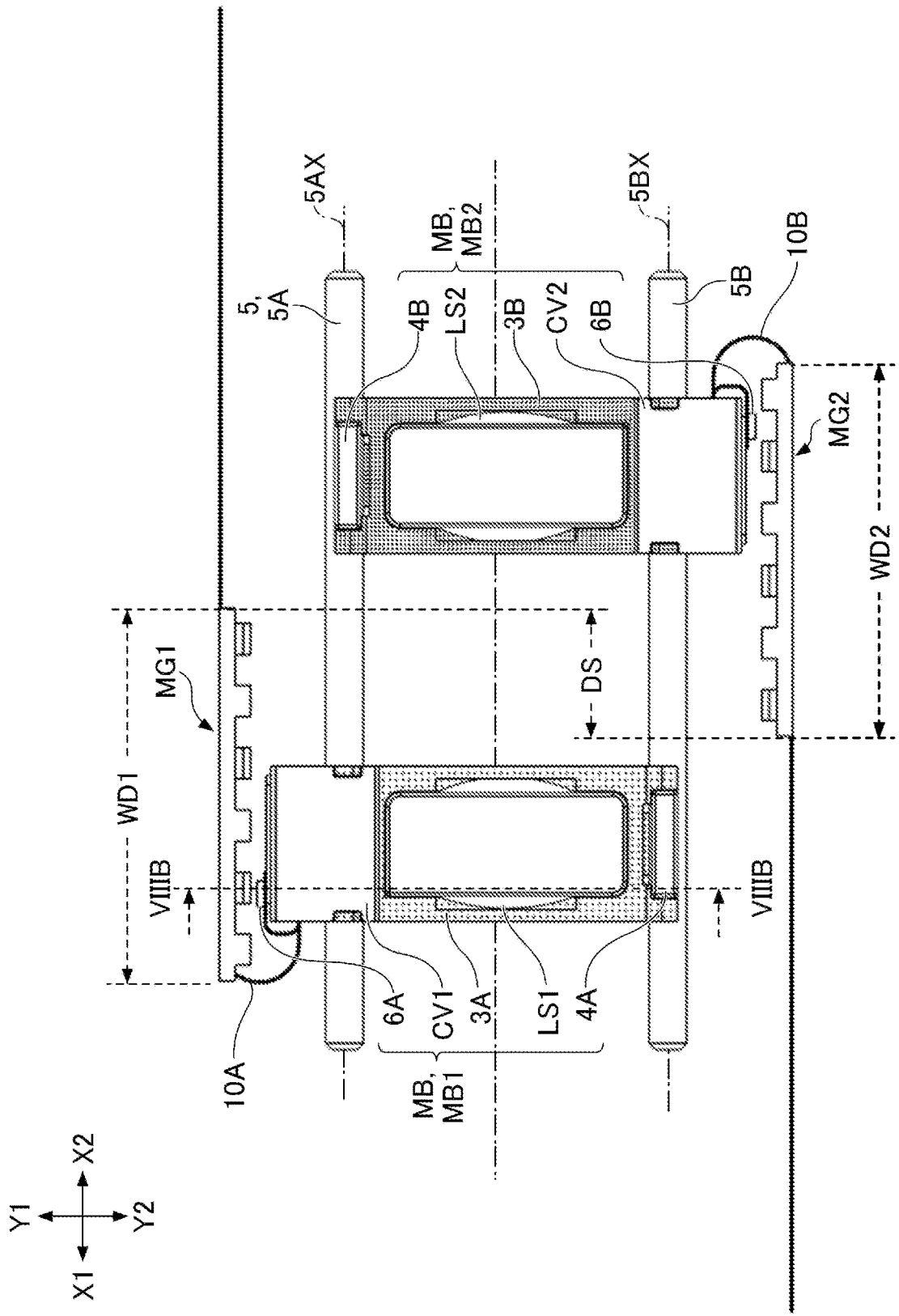
FIG. 8A is a top view of the lens holder driving device.
Figure 8B:
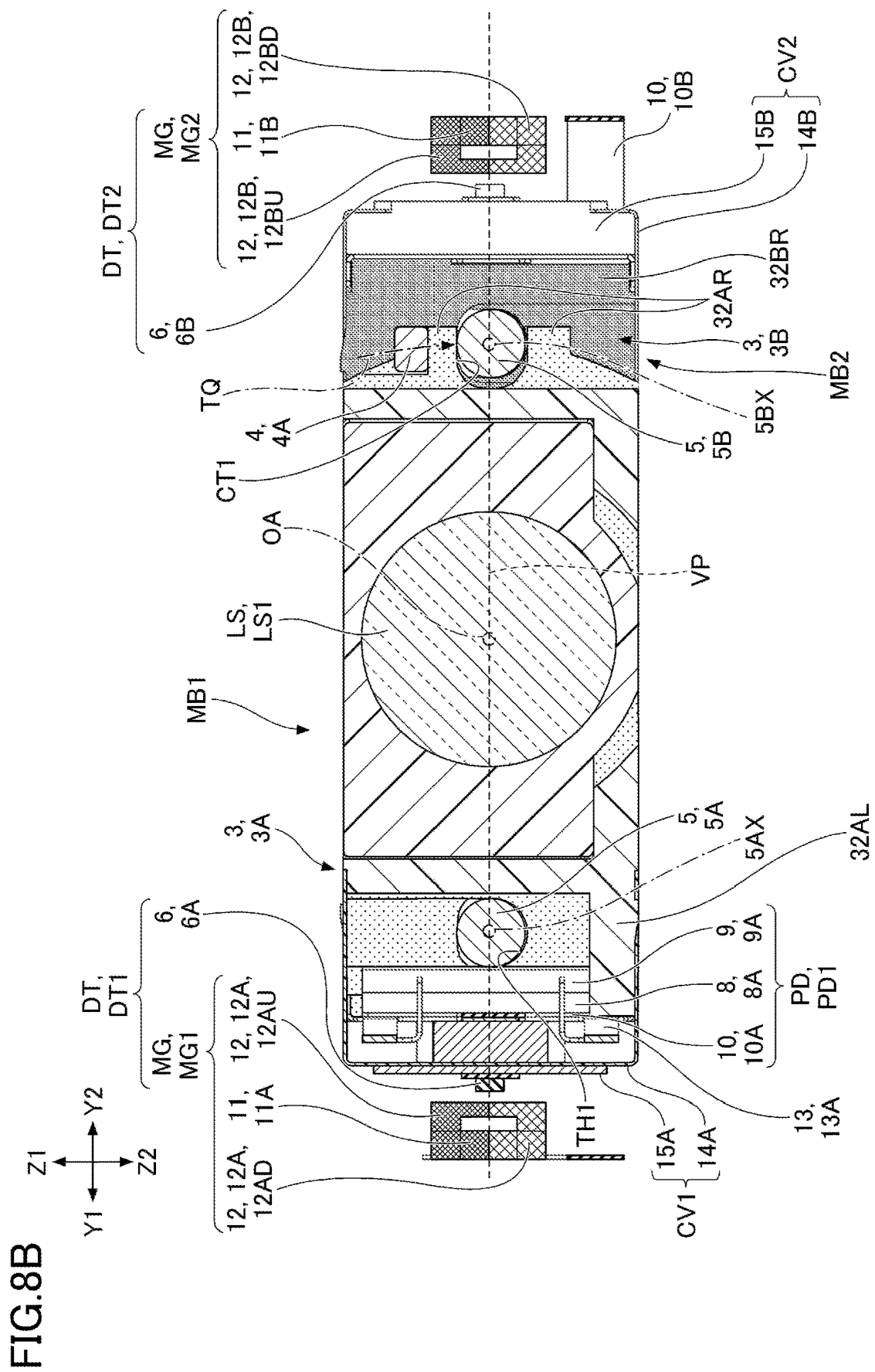
FIG. 8B is a cross-sectional view of the lens holder driving device.

The movable members MB and the position detecting mechanisms DT will be described next with reference to FIGS. 3, 8A, and 8B. FIG. 8A is a top view of the lens holder driving device 101. FIG. 8B is a cross-sectional view of the lens holder driving device 101. More specifically, FIG. 8B is a view in which the cross-section of the lens holder driving device 101, which is taken along a plane parallel to the Y-Z plane including a cutting plane line (broken lines VIIIB-VIIIB) illustrated in FIG. 8A, is seen from the X1 side. Note that for the sake of clarity in FIGS. 8A and 8B, the lid member 1 and the base member 2 have not been illustrated, a coarse dot pattern has been added to the first lens holder 3A, and a fine dot pattern has been added to the second lens holder 3B.

As illustrated in FIG. 8A, the movable members MB include a first movable member MB1 and a second movable member MB2. The first movable member MB1 includes the first lens holder 3A, the first moving magnet 4A, the first magnetic sensor 6A, the first cover CV1, and the first lens body LS1. The second movable member MB2 includes the second lens holder 3B, the second moving magnet 4B, a second magnetic sensor 6B, the second cover CV2, and the second lens body LS2.

As illustrated in FIG. 8B, the first moving magnet 4A is provided in a position away from a virtual plane VP. More specifically, the first moving magnet 4A is provided in a position not on the virtual plane VP (that is, a position higher than the position of the virtual plane VP). The virtual plane VP is a virtual plane which includes the axis (the axis 5AX) of the first shaft member 5A and the axis (the axis 5BX) of the second shaft member 5B which are parallel to each other. In the example illustrated in FIG. 8B, each lens holder 3 is arranged such that the optical axis OA of the lens body LS is positioned on the virtual plane VP. Also, in the example illustrated in FIG. 8B, each movable member MB is arranged such that the distance between the optical axis OA and the axis (the axis 5AX) of the first shaft member 5A is equal to the distance between the optical axis OA and the axis (the axis 5BX) of the second shaft member 5B. In addition, in the example illustrated in FIG. 8B, the first movable member MB1, which includes the first lens holder 3A, the first moving magnet 4A, the first cover CV1, the first lens body LS1, and the first piezoelectric driver PD1, is arranged such that its center of mass is positioned on the virtual plane VP. Arranging the first movable member MB1 in such a manner can limit the torque generated about the center of mass when the first movable member MB1 moves along the shaft members 5. This configuration is similarly applicable to the second movable member MB2. More specifically, as illustrated in FIG. 3, the base member 2 as the fixed member FB includes the bottom surface 2B. As illustrated in FIG. 4, the upper part of each lens holder 3 is opened such that the lens body LS can be accommodated (received). Also, as illustrated in FIG. 8B, the moving magnet 4 (the first moving magnet 4A) is provided in an offset position which is closer to the upper side (Z1 side) than the virtual plane VP. Note that the moving magnet 4 may be provided in an offset position which is closer to the lower side (the Z2 side) than the virtual plane VP.

As illustrated in FIG. 8B, each position detecting mechanism DT is a mechanism for detecting the position of the lens holder 3, and includes the magnetic sensor 6 and a magnetic field generating member MG. The magnetic field generating member MG includes a fixed magnet 11 and magnetic members 12.

Each magnetic sensor 6 is configured to detect the magnetic field generated by the magnetic field generating member MG. In FIG. 8B, the magnetic sensor 6 is formed by a giant magnetoresistive (GMR) element. The magnetic sensor 6 is configured to detect the position of the lens holder 3, to which it is attached, by measuring the voltage value which changes in accordance with the magnitude of the magnetic field received from the magnetic field generating member MG. The magnetic sensor 6 is configured to output a voltage such that the voltage value increases as the N-pole portion becomes closer and the voltage value decreases as the S-pole portion becomes closer. However, the magnetic sensor 6 may be configured to output a lower voltage value as the N-pole portion becomes closer, and a higher voltage value as the S-pole portion becomes closer. In the magnetic sensor 6 may be configured to detect the position of the lens holder 3 by using another magnetoresistive element, such as a semiconductor magnetoresistive (SMR) element, an anisotropic magnetoresistive (AMR) element, or a tunnel magnetoresistive (TMR) element. Alternatively, the magnetic sensor 6 may be configured to detect the position of the lens holder 3 by using a hall sensor or the like.

As illustrated in FIG. 8B, the position detecting mechanisms DT include a first position detection mechanism DT1 for detecting the position of the first lens holder 3A and a second position detection mechanism DT2 for detecting the position of the second lens holder 3B. The first position detection mechanism DT1 includes the first magnetic sensor 6A and a first magnetic field generating member MG1, and the second position detection mechanism DT2 includes the second magnetic sensor 6B and a second magnetic field generating member MG2.

As illustrated in FIG. BA, a width WD1 is the length (width) of the first magnetic field generating member MG1 in the optical-axis direction, and a width WD2 is the length (width) of the second magnetic field generating member MG2 in the optical-axis direction. The first magnetic field generating member MG1 overlaps the second magnetic field generating member MG2 over a distance DS in the optical-axis direction.

In addition, as illustrated in FIG. BB, the first magnetic field generating member MG1 includes a first fixed magnet 11A and first magnetic members 12A, and the second magnetic field generating member MG2 includes a second fixed magnet 11B and second magnetic members 12B. The first magnetic members 12A include an upper first magnetic member 12AU and a lower first magnetic member 12AD, and the second magnetic members 12B include an upper second magnetic member 12BU and a lower second magnetic member 12BD.

Figure 9A:
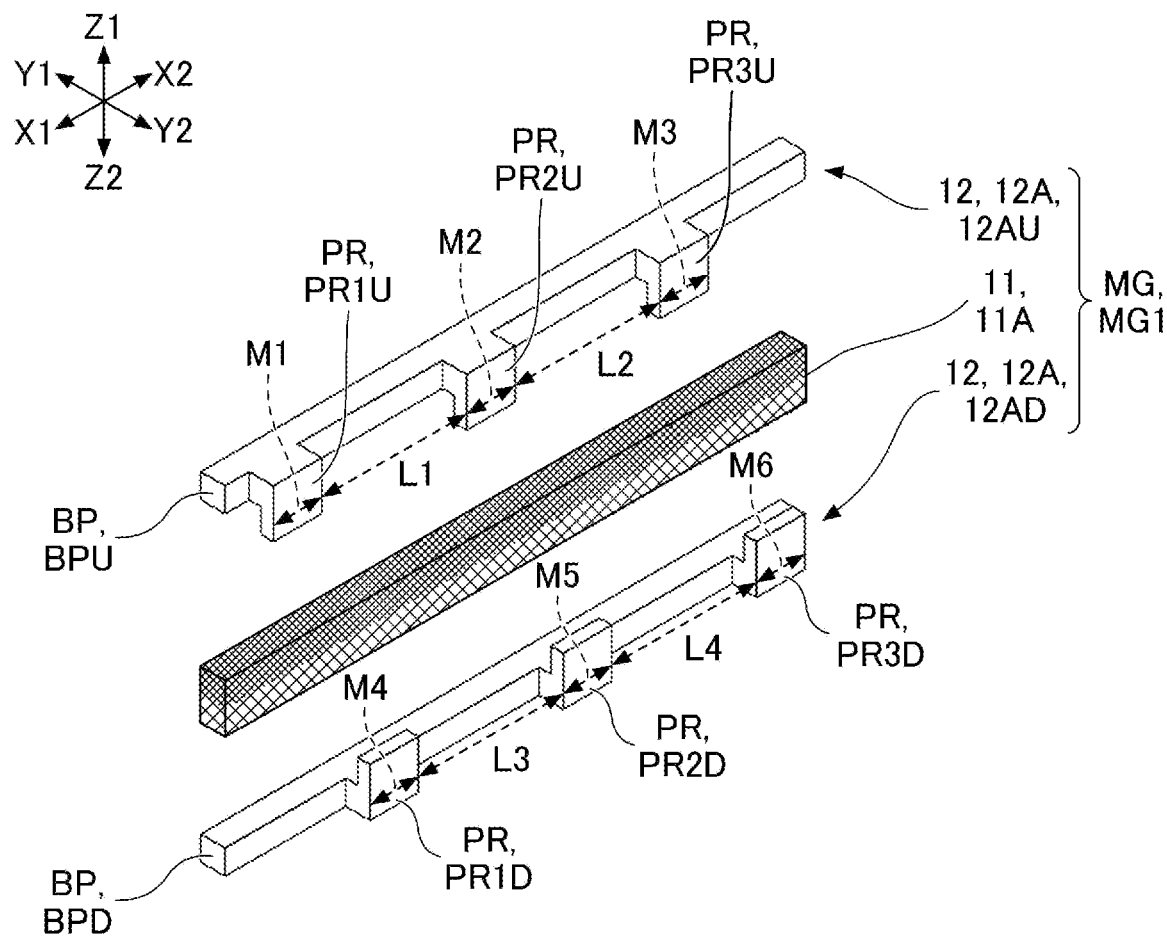
FIG. 9A is an exploded perspective view of a magnetic field generating member before a magnetic member is attached to a fixed magnet.
Figure 9B:
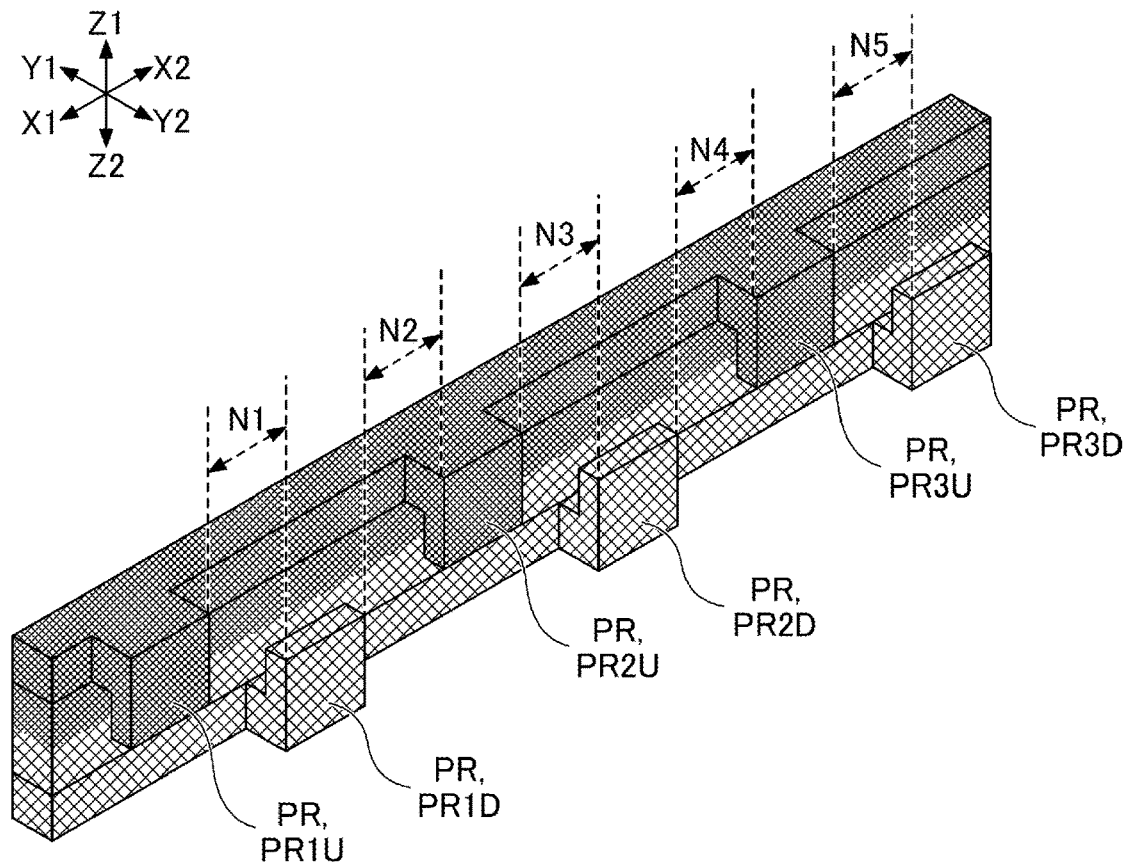
FIG. 9B is a perspective view illustrating the assembled state of the magnetic field generating member after the magnetic member is attached to the fixed magnet.
Figure 9C:
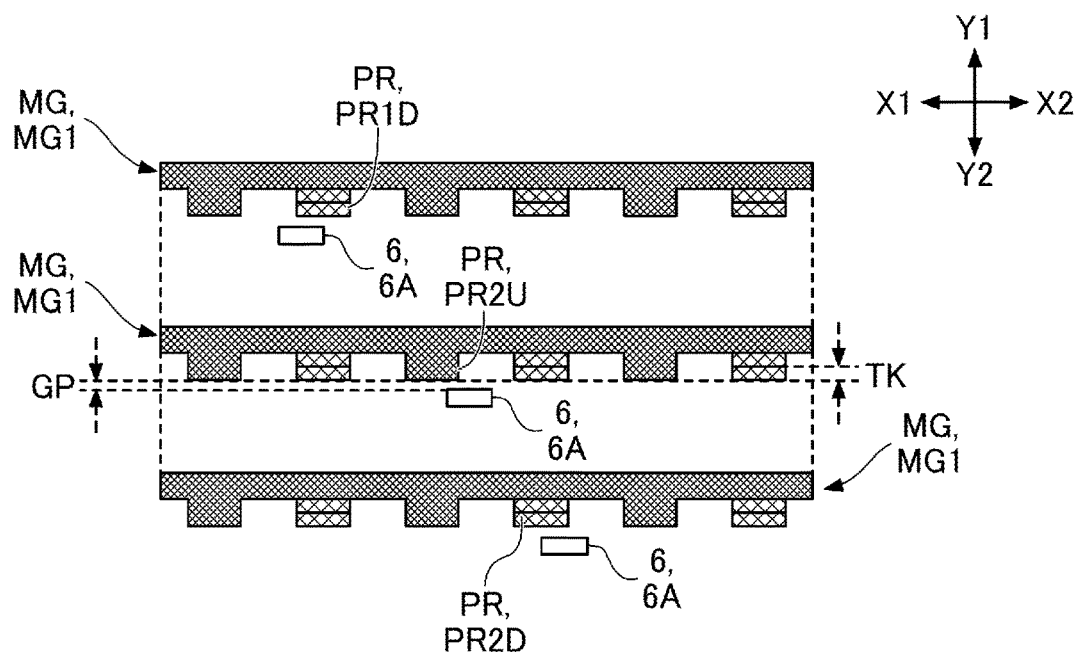
FIG. 9C is a top view of a magnetic sensor and the magnetic field generating member.
Figure 9D:
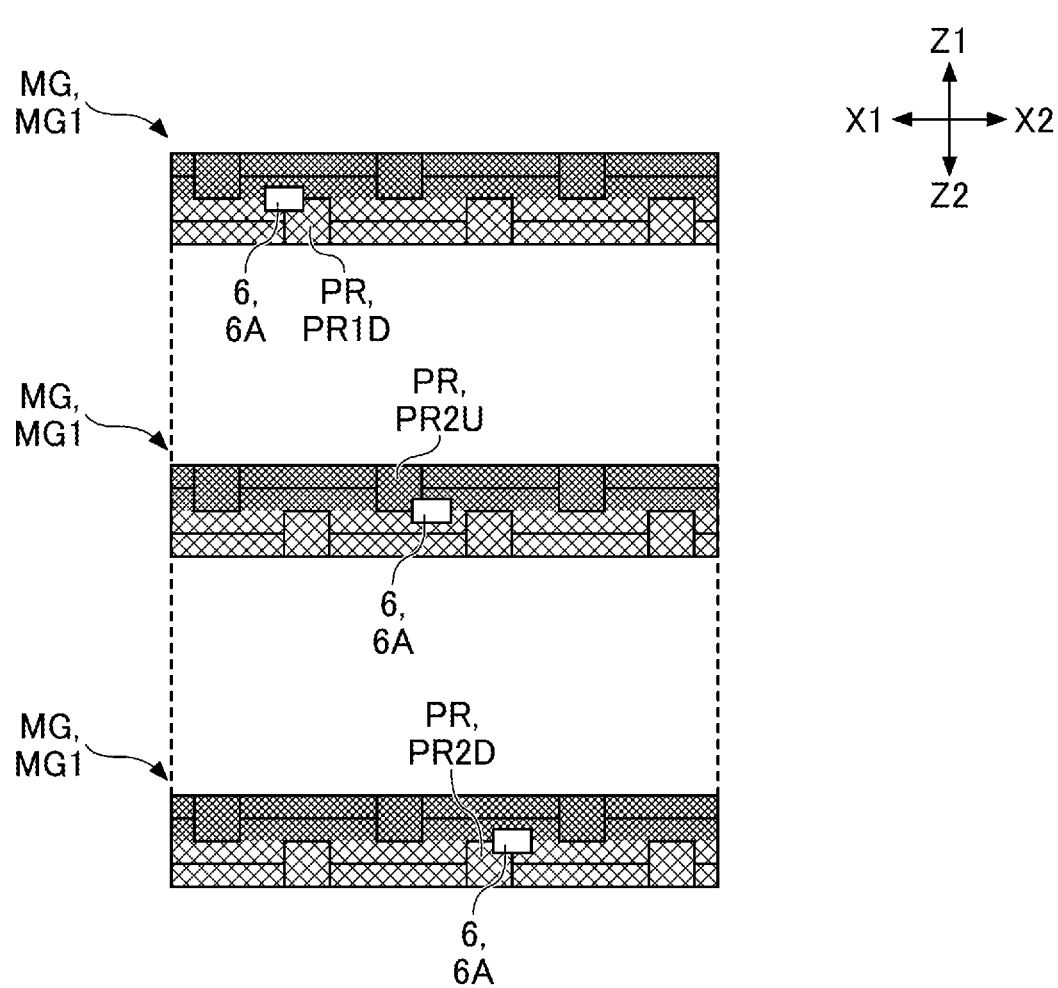
FIG. 9D is a view illustrating the right side of the magnetic sensor and the magnetic field generating member.

The magnetic field generating member MG will be described in detail with reference to FIGS. 9A to 9D. FIG. 9A is an exploded perspective view of the magnetic field generating member MG before the magnetic members 12 are attached to the fixed magnet 11. FIG. 9B is a perspective view illustrating the assembled state of the magnetic field generating member MG after the magnetic members 12 were attached to the fixed magnet 11. FIGS. 9C and 9D each illustrate the positional relationship between the magnetic sensor 6 and the magnetic field generating member MG which changes in accordance with the movement of the lens holder 3 in the optical-axis direction. More specifically, FIG. 9C is a top view of the magnetic sensor 6 and the magnetic field generating member MG, and FIG. 9D is a view illustrating the right side of the magnetic sensor 6 and the magnetic field generating member MG. Note that FIGS. 9A to 9D are related to the first magnetic field generating member MG1 which is attached to the inner surface of the second side plate 2A2 of the base member 2. In FIGS. 9A to 9D, assume that the first magnetic field generating member MG1 is fixed to the inner surface of the second side plate 2A2 of the base member 2 with an adhesive. Note that the following description to be given with reference to FIGS. 9A to 9D is also similarly applicable to the second magnetic field generating member MG2 which is attached to the inner surface of the fourth side plate 2A4 of the base member 2.

As illustrated in FIG. 9A, the first magnetic field generating member MG1 includes the first fixed magnet 11A, the upper first magnetic member 12AU, and the lower first magnetic member 12AD.

The first fixed magnet 11A is a permanent magnet that has undergone dipole magnetization in the Z-axis direction which is a direction perpendicular to the optical-axis direction. In FIG. 9A, the first fixed magnet 11A has been magnetized such that one end (the upper end portion) in the direction (Z-axis direction) perpendicular to the optical-axis direction is the N pole and the other end (the lower end portion) is the S pole. For the sake of clarity, a fine cross-hatched pattern has been added to the N-pole portion of the first fixed magnet 11A and a coarse cross-hatched pattern has been added to the S-pole portion of the first fixed magnet 11A in FIG. 9A.

In FIG. 9B, both the upper first magnetic member 12AU and the lower first magnetic member 12AD have been coupled to the first fixed magnet 11A. In FIG. 9B, the upper first magnetic member 12AU and the lower first magnetic member 12AD are fixed to the first fixed magnet 11A with an adhesive.

More specifically, the upper first magnetic member 12AU is magnetized to the N pole by being coupled to the N-pole portion which is the one end (the upper end portion) of the first fixed magnet 11A, and the lower first magnetic member 12AD is magnetized to the S pole by being coupled to the S-pole portion which is the other end (the lower end portion) of the first fixed magnet 11A. Hence, in FIG. 9B, a fine cross-hatched pattern has been added to the upper first magnetic member 12AU in a manner similar to the N-pole portion of the first fixed magnet 11A, and a coarse cross-hatched pattern has been added to the lower first magnetic member 12AD in a manner similar to the S-pole portion of the first fixed magnet 11A. Fine and coarse cross-hatched patterns have been illustrated in FIGS. 9C and 9D in a similar manner. However, in the state illustrated in FIG. 9A, the fine cross-hatched pattern and coarse cross-hatched pattern have not been added to the upper first magnetic member 12AU and the lower first magnetic member 12AD, respectively, because neither of the upper first magnetic member 12AU and the lower first magnetic member 12AD is magnetized by being coupled to the first fixed magnet 11A.

As illustrated in FIG. 9A, each first magnetic member 12A includes a rod-shaped portion BP and L-shaped protrusions PR which protrude from the rod-shaped portion BP in the Y-axis direction and subsequently protrude in the Z-axis direction. More specifically, the upper first magnetic member 12AU includes an upper rod-shaped portion BPU and three protrusions PR (a first upper protrusion PR1U to a third upper protrusion PR3U). Each of the first upper protrusion PR1U to the third upper protrusion PR3U protrudes rightward (the Y2 direction) from the upper rod-shaped portion BPU and subsequently protrudes toward the side of the first fixed magnet 11A (the Z2 direction). The lower first magnetic member 12AD includes a lower rod-shaped portion BPD and three protrusions PR (a first lower protrusion PR1D to a third lower protrusion PR3D). Each of the first lower protrusion PR1D to the third lower protrusion PR3D protrudes rightward (the Y2 direction) from the lower rod-shaped portion BPD and subsequently protrudes toward the side of the first fixed magnet 11A (the Z1 direction).

Furthermore, in FIG. 9A, the upper first magnetic member 12AU and the lower first magnetic member 12AD are formed such that the first upper protrusion PR1U to the third upper protrusion PR3U and the first lower protrusion PR1D to the third lower protrusion PR3D are arranged alternately in the extending direction (the X-axis direction) of the first magnetic field generating member MG1.

More specifically, as illustrated in FIG. 9B, the upper first magnetic member 12AU and the lower first magnetic member 12AD are formed such that the first upper protrusion PR1U is arranged on the frontmost side (X1 side) of the extending direction (X-axis direction) of the first magnetic field generating member MG1, the first lower protrusion PR1D is arranged on the rear side (X2 side) of the first upper protrusion PR1U, the second upper protrusion PR2U is arranged further on the rear side (X2 side) of the first lower protrusion PR1D, the second lower protrusion PR2D is arranged further on the rear side (X2 side) of the second upper protrusion PR2U, the third upper protrusion PR3U is arranged further on the rear side (X2 side) of the second lower protrusion PR2D, and the third lower protrusion PR3D is arranged further on the rear side (X2 side) of the third upper protrusion PR3U.

In addition, as illustrated in FIG. 9A, the upper first magnetic member 12AU and the lower first magnetic member 12AD are formed such that a width M1 of the first upper protrusion PR1U, a width M2 of a second upper protrusion PR2U, a width M3 of a third upper protrusion PR3U, a width M4 of the first lower protrusion PR1D, a width M5 of a second lower protrusion PR2D, and a width M6 of the third lower protrusion PR3D in the extending direction (X-axis direction) of the first magnetic field generating member MG1 are the same.

In addition, as illustrated in FIG. 9A, the upper first magnetic member 12AU and the lower first magnetic member 12AD are formed such that a space L1 between the first upper protrusion PR1U and the second upper protrusion PR2U, a space L2 between the second upper protrusion PR2U and the third upper protrusion PR3U, a space L3 between the first lower protrusion PR1D and the second lower protrusion PR2D, and a space L4 between the second lower protrusion PR2D and the third lower protrusion PR3D in the extending direction (X-axis direction) of the first magnetic field generating member MG1 are the same length.

Further, as illustrated in FIG. 9B, the upper first magnetic member 12AU and the lower first magnetic member 12AD are formed such that a space N1 between the first upper protrusion PR1U and the first lower protrusion PR1D, a space N2 between the first lower protrusion PR1D and the second upper protrusion PR2U, a space N3 between the second upper protrusion PR2U and the second lower protrusion PR2D, a space N4 between the second lower protrusion PR2D and the third upper protrusion PR3U, and a space N5 between the third upper protrusion PR3U and the third lower protrusion PR3D in the extending direction (the X-axis direction) of the first magnetic field generating member MG1 are the same length.

In addition, the first upper protrusion PR1U to the third upper protrusion PR3U of the upper first magnetic member 12AU and the first lower protrusion PR1D to the third lower protrusion PR3D of the lower first magnetic member 12AD include protruding portions in the Z-axis direction (the side of the first fixed magnet 11A). As illustrated in FIG. 9C, the upper first magnetic member 12AU and the lower first magnetic member 12AD are formed such that the respective thicknesses TK of the protruding portions in the Z-axis direction are the same.

Furthermore, as illustrated in FIG. 9C, the upper first magnetic member 12AU and the lower first magnetic member 12AD are formed such that a uniform space GP is provided between the magnetic sensor 6 (the first magnetic sensor 6A), which is fixed to the lens holder 3 (not illustrated), and the right-side (Y2-side) end of each of the first upper protrusion PR1U to the third upper protrusion PR3U and the first lower protrusion PR1D to the third lower protrusion PR3D.

In this manner, the upper first magnetic member 12AU and the lower first magnetic member 12AD are formed as identical components that are the same shape and size. However, the upper first magnetic member 12AU and the lower first magnetic member 12AD may be formed as different components that are different shapes or sizes. For example, the upper first magnetic member 12AU and the lower first magnetic member 12AD may be formed to have varying widths M1 to M6. Further, the spaces L1 to L4 may be formed to have varying lengths in a similar manner, and the spaces N1 to N5 may also be formed to have varying lengths in a similar manner. Furthermore, the upper first magnetic member 12AU and the lower first magnetic member 12AD may be formed to have varying thicknesses TK in respective portions, which protrude in the Z-axis direction (the side of the first fixed magnet 11A), of the first upper protrusion PR1U to the third upper protrusion PR3U and the first lower protrusion PR1D to the third lower protrusion PR3D. The space GP may also vary in a similar manner.

In the embodiment, the upper first magnetic member 12AU and the lower first magnetic member 12AD are formed such that the respective distal end portions, which protrude in the Z-axis direction (the side of the first fixed magnet 11A), of the first upper protrusion PR1U to third upper protrusion PR3U and the first lower protrusion PR1D to third lower protrusion PR3D reach the boundary of the N-pole portion and the S-pole portion of the first fixed magnet 11A in a view seen from the right side as illustrated in FIG. 9D. However, the upper first magnetic member 12AU and the lower first magnetic member 12AD may be formed to have varying amounts of protrusion with respect to the respective portions, which protrude in the Z-axis direction (the side of the first fixed magnet 11A), of the first upper protrusion PR1U to third upper protrusion PR3U and the first lower protrusion PR1D to third lower protrusion PR3D.

The positional relationship between the first magnetic field generating member MG1 and the first magnetic sensor 6A when the first lens holder 3A is positioned at a reference position indicated in FIG. 1B is illustrated in the center portion of each of FIGS. 9C and 9D. The positional relationship between the first magnetic field generating member MG1 and the first magnetic sensor 6A when the first lens holder 3A has moved forward (in the X1 direction) from the reference position is illustrated in the upper portion of each of FIGS. 9C and 9D. The positional relationship between the first magnetic field generating member MG1 and the first magnetic sensor 6A when the first lens holder 3A moves rearward (in the X2 direction) from the reference position is illustrated in the lower portion of each of FIGS. 9C and 9D.

To detect the magnetic field generated by each of the first upper protrusion PR1U to the third upper protrusion PR3U and the first lower protrusion PR1D to the third lower protrusion PR3D, the first magnetic sensor 6A is provided on the sensor fixing portion 10S of the first circuit board 10A fixed to the first lens holder 3A.

As illustrated in the center portion of each of FIGS. 9C and 9D, when the first lens holder 3A is positioned at the reference position, the first magnetic sensor 6A partially opposes the second upper protrusion PR2U of the upper first magnetic member 12AU as the N-pole portion.

As illustrated in the upper portion of each of FIGS. 9C and 9D, when the first lens holder 3A moves forward (in the X1 direction) from the reference position, the first magnetic sensor 6A moves away from the second upper protrusion PR2U of the upper first magnetic member 12AU as the N-pole portion to partially face the first lower protrusion PR1D of the lower first magnetic member 12AD as the S-pole portion.

Also, as illustrated in the lower portion of each of FIGS. 9C and 9D, when the first lens holder 3A moves rearward (in the X2 direction) from the reference position, the first magnetic sensor 6A moves away from the second upper protrusion PR2U of the upper first magnetic member 12AU as the N-pole portion to partially face the second lower protrusion PR2D of the lower first magnetic member 12AD as the S-pole portion.

By using the position detecting mechanisms DT as described above, a control device (not illustrated), which is coupled to the first magnetic sensor 6A via a conductive pattern formed on the first circuit board 10A, can detect the position of the first lens holder 3A based on the value of the voltage output from the first magnetic sensor 6A. Note that although the control device is provided outside the housing HS in the embodiment, the control device may be provided inside the housing HS.

In the embodiment, each magnetic field generating member MG is formed by a single dipole permanent magnet. However, each magnetic field generating member MG may be formed by a combination of a plurality of dipole permanent magnets, a single multipole permanent magnet, or a combination of a plurality of multipole permanent magnets.

Figure 10:
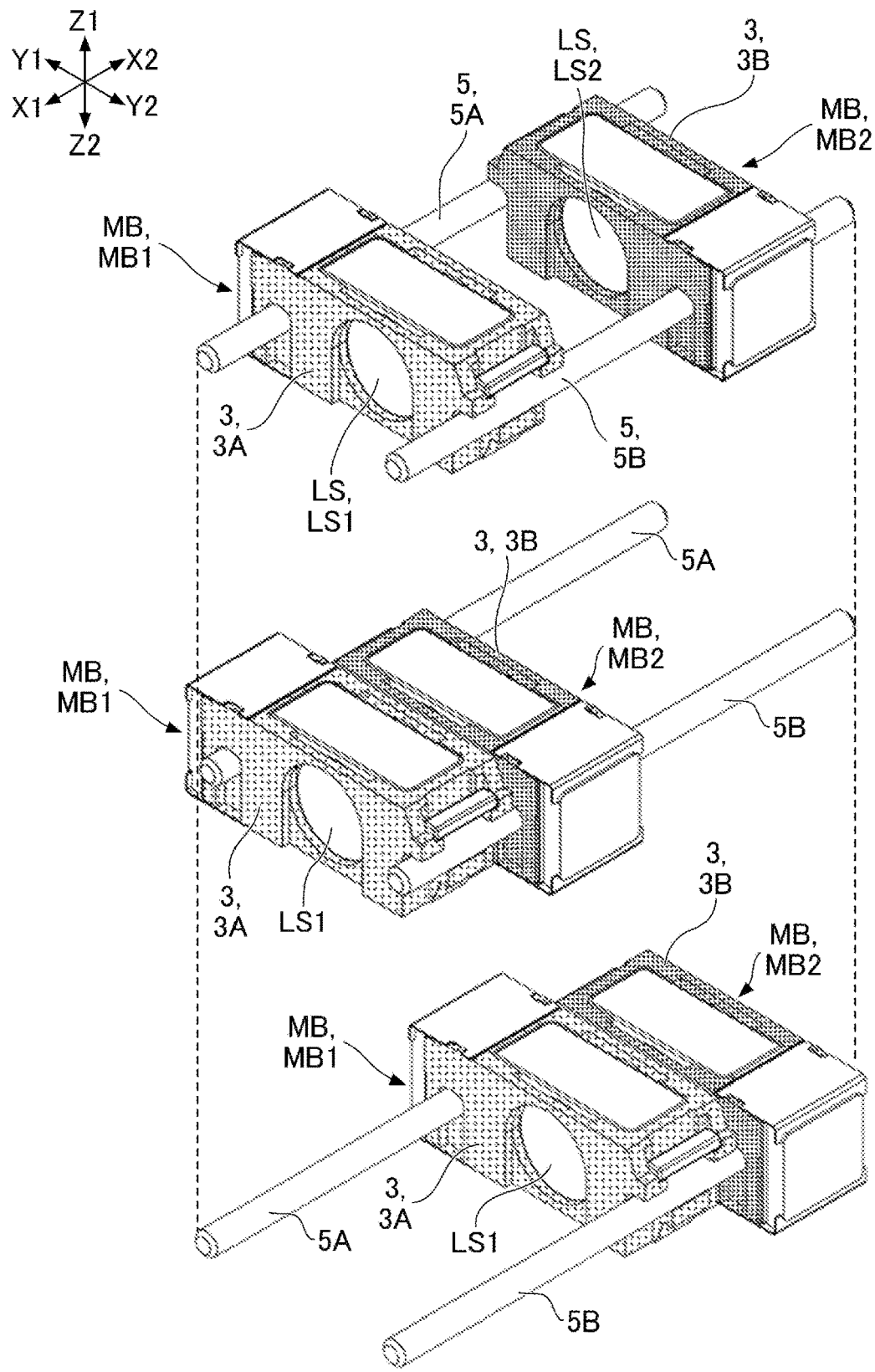
FIG. 10 is a perspective view of shaft members and movable members.

The movement of the movable members MB will be described with reference to FIG. 10. FIG. 10 is a perspective view of the shaft members 5 and the movable members MB. More specifically, the positional relationship of the main components (the lens holders 3, the shaft members 5, and the lens bodies LS) when the first movable member MB1 and the second movable member MB2 are at their respective reference positions is illustrated in the upper part of FIG. 10. The positional relationship of the main components when the first movable member MB1 has moved to the frontmost side (the X1 side) and the second movable member MB2 has moved to the frontmost side (the X1 side) is illustrated in the middle part of FIG. 10. The positional relationship of the main components when the second movable member MB2 moves to the rearmost side (the X2 side) and the first movable member MB1 moves to the rearmost side (the X2 side) is illustrated in the lower part of FIG. 10.

As illustrated in FIG. 10, the lens holder driving device 101 can move the first movable member MB1 and the second movable member MB2 separately along the optical-axis direction.

Figure 11A:
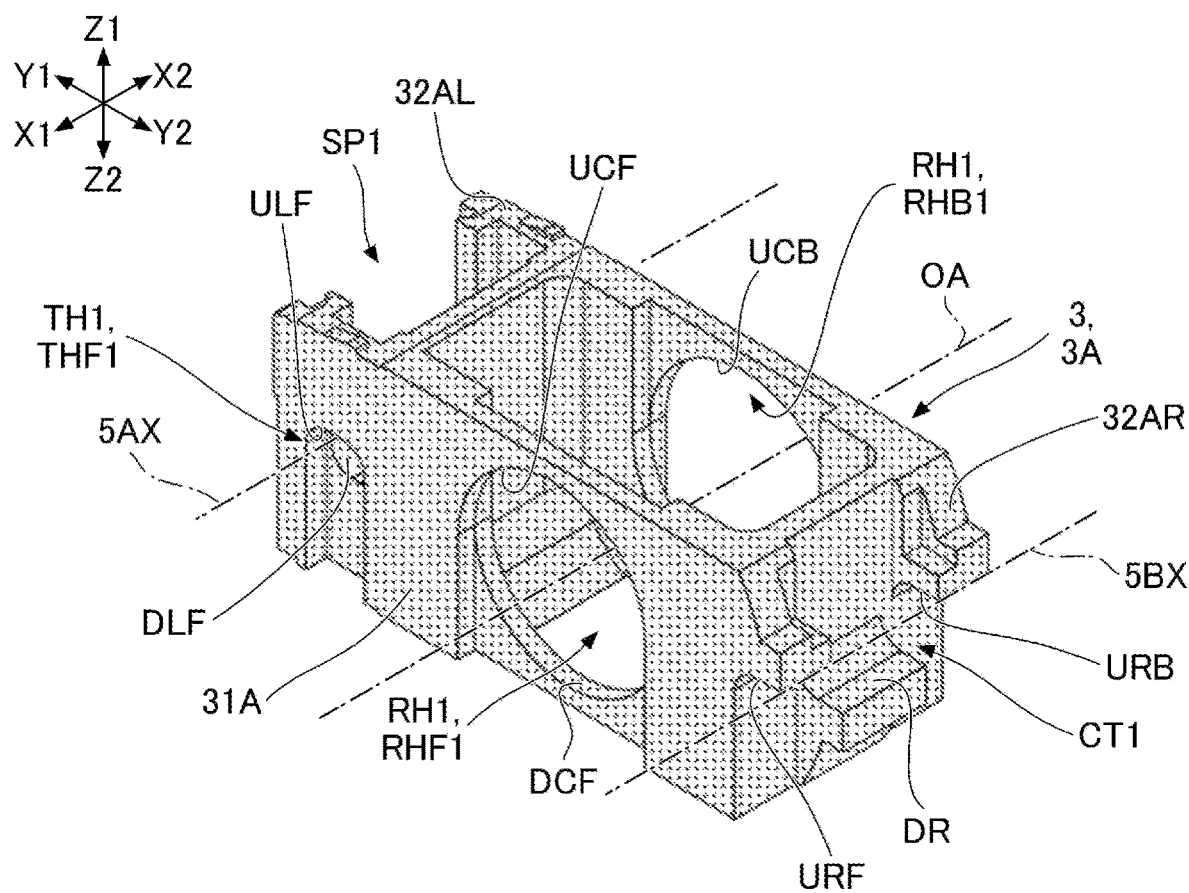
FIG. 11A is a front perspective view of the lens holder.
Figure 11B:
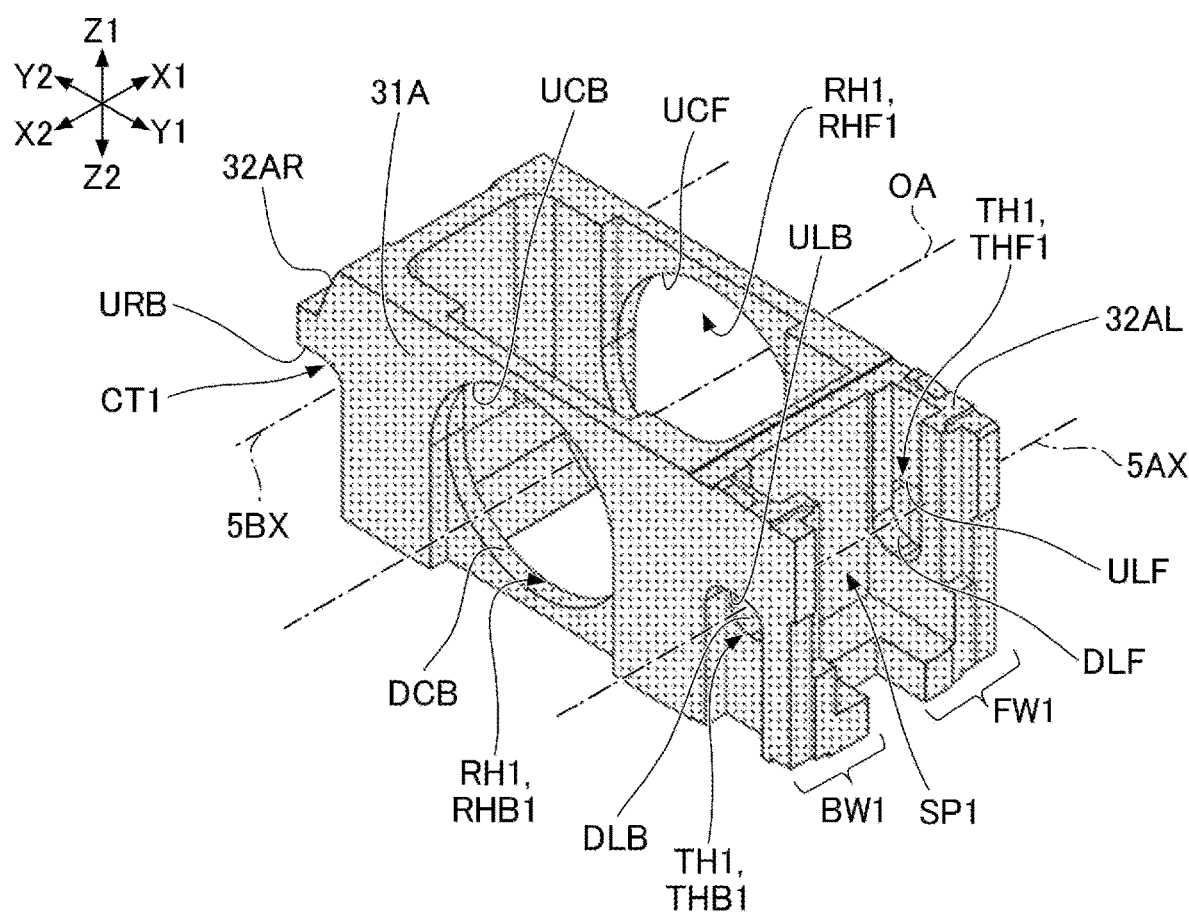
FIG. 11B is a rear perspective view of the lens holder.

The lens holder 3 will be described in detail next with reference to FIGS. 11A and 11B. FIG. 11A is a front perspective view of the lens holder 3, and FIG. 11B is rear perspective view of the lens holder 3. Although the following description to be given with reference to FIGS. 11A and 11B is related to the first lens holder 3A, the following description can also be similarly applied to the second lens holder 3B.

As described above, the first lens holder 3A includes the first holder 31A, the first left-bearing portion 32AL, and the first right-bearing portion 32AR.

The first holder 31A includes a first through hole RH1 through which the optical axis OA passes. The first through hole RH1 include a first front through hole RHF1 and a first rear through hole RHB1. In FIGS. 11A and 11B, the first front through hole RHF1 is formed by a pair of U-shaped grooves, that is, a lower front U-shaped groove DCF which opens upward in the Z1 direction (predetermined direction) and an upper front U-shaped groove UCF which opens downward in the Z2 direction (direction opposite to the predetermined direction). More specifically, the lower front U-shaped groove DCF and the upper front U-shaped groove UCF are arranged to be adjacent to each other in the front to rear direction (the X-axis direction) and to oppose each other in the vertical direction. In a similar manner, the first rear through hole RHB1 is formed by a pair of U-shaped grooves, that is, a lower rear U-shaped groove DCB which opens upward in the Z1 direction (predetermined direction) and an upper rear U-shaped groove UCB which opens downward in the Z2 direction (direction opposite to the predetermined direction). More specifically, the lower rear U-shaped groove DCB and the upper rear U-shaped groove UCB are arranged to be adjacent to each other in the front to rear direction (the X-axis direction) and to oppose each other in the vertical direction.

In addition, the first left-bearing portion 32AL includes first through holes TH1 through which the axis 5AX of the first shaft member 5A passes. The first through holes TH1 include a first front through hole THF1 and a first rear through hole THB1. In FIG. 11B, the first front through hole THF1 is formed by a pair of a lower front U-shaped groove DLF which opens upward in the Z1 direction (predetermined direction) and an upper front U-shaped groove ULF which opens downward in the Z2 direction (direction opposite to the predetermined direction). More specifically, the lower front U-shaped groove DLF and the upper front U-shaped groove ULF are arranged to be adjacent to each other in the front to rear direction (the X-axis direction) and to oppose each other in the vertical direction. In a similar manner, the first rear through hole THB1 is formed by a pair of U-shaped grooves, that is, a lower rear U-shaped groove DLB which opens upward in the Z1 direction (predetermined direction) and an upper rear U-shaped groove ULB which opens downward in the Z2 direction (direction opposite to the predetermined direction). More specifically, the lower rear U-shaped groove DLB and the upper rear U-shaped groove ULB are arranged to be adjacent to each other in the front to rear direction (the X-axis direction) and to oppose each other in the vertical direction.

In addition, the first right-bearing portion 32AR includes a first semi-circle cutout CT1 through which the axis 5BX of the second shaft member 5B passes. In FIG. 11A, the first semi-circle cutout CT1 is formed by a combination of an upper front L-shaped groove URF, an upper rear L-shaped groove URB, and a lower L-shaped groove DR. The upper front L-shaped groove URF and the upper rear L-shaped groove URB open downward (in the Z2 direction) and rightward (in the Y2 direction). The lower L-shaped groove DR opens upward (in the Z1 direction) and rightward (in the Y2 direction). More specifically, the upper front L-shaped groove URF and the lower L-shaped groove DR are aligned in the front to rear direction (the X-axis direction). In a similar manner, the lower L-shaped groove DR and the upper rear L-shaped groove URB are aligned in the front to rear direction (the X-axis direction).

In this manner, each of the first front through hole THF1 and the first rear through hole THB1 is formed by a pair of U-shaped grooves, and the first semi-circle cutout CT1 is formed by a combination of L-shaped grooves. Hence, the first lens holder 3A can be manufactured by injection molding using a pair of molds (an upper mold and a lower mold) that can be separated in the vertical direction and do not include a slide core. Therefore, such a configuration can reduce the manufacturing cost of the lens holder driving device 101.

As described above, the lens holder driving device 101 according to the embodiment of the present disclosure includes, as illustrated in FIGS. 3 and 4, the fixed member FB (the base member 2), the first lens holder 3A which can hold the first lens body LS1, the second lens holder 3B which can hold the second lens body LS2 arranged to have the same optical axis OA as the first lens body LS1, the first shaft member 5A and the second shaft member 5B which are attached to the fixed member FB (the base member 2) and can guide the movement of the first lens holder 3A and the second lens holder 3B in the optical-axis direction with respect to the fixed member FB (the base member 2), the first piezoelectric driver PD1 which includes the first piezoelectric element 8A and moves the first lens holder 3A along the optical-axis direction by the movement (circular motion) of the first piezoelectric element 8A, and the second piezoelectric driver PD2 which includes the second piezoelectric element 8B and moves the second lens holder 3B along the optical-axis direction by the movement (circular motion) of the second piezoelectric element 8B. The first lens holder 3A includes a portion (the first left-bearing portion 32AL) near the first shaft member 5A and a portion (the first right-bearing portion 32AR) near the second shaft member 5B. The first piezoelectric driver PD1 is arranged at the portion (the first left-bearing portion 32AL) near the first shaft member 5A in the first lens holder 3A, and contacts the first shaft member 5A. The second lens holder 3B includes a portion (the second left-bearing portion 32BL) near the first shaft member 5A and a portion (the second right-bearing portion 32BR) near the second shaft member 5B. The second piezoelectric driver PD2 is arranged at the portion (the second right-bearing portion 32BR) near the second shaft member 5B in the second lens holder 3B, and contacts the second shaft member 5B.

In this configuration, the movement of the first piezoelectric driver PD1 and the movement of the second piezoelectric driver PD2 can be prevented from interfering with each other via the same one axial member 5 when the first lens holder 3A and the second lens holder 3B are moved simultaneously in the optical-axis direction. This is because the first piezoelectric driver PD1 is configured to contact the first shaft member 5A and the second piezoelectric driver PD2 is configured to contact the second shaft member 5B. Hence, in this configuration, the first lens holder 3A and the second lens holder 3B can be moved simultaneously in a stable manner. In this case, the first lens holder 3A and the second lens holder 3B may move in the same direction or move in opposite directions from each other.

In addition, in the above-described embodiment, the pair of lens holders 3 (the first lens holder 3A and the second lens holder 3B) are formed as identical components that have the same shape and size. The respective pairs of the moving magnets 4, the shaft members 5, the magnetic sensors 6, the piezoelectric elements 8, the contact members 9, the circuit boards 10, the fixed magnets 11, the magnetic members 12, the biasing members 13, the metal parts 14, and the synthetic resin parts 15 are also formed to be identical components in a manner similar to the pair of lens holders 3.

This configuration can reduce the number of components used in the lens holder driving device 101.

In addition, as illustrated in FIG. 4 in the above-described embodiment, the first piezoelectric element 8A may extend in a direction intersecting a direction (the X-axis direction) of the axis (the axis 5AX) of the first shaft member 5A. The second piezoelectric element 8B may extend in a direction intersecting the direction of the axis (axis 5BX) of the second shaft member 5B.

In this configuration, each shaft member 5 can be reliably brought into contact with the corresponding piezoelectric driver PD even when the shaft member 5 has a cylindrical shape. More specifically, in this configuration, the first shaft member 5A can be reliably brought into contact with the first piezoelectric driver PD1, and the second shaft member 5B can be reliably brought into contact with the second piezoelectric driver PD2. Note that in FIG. 4, each piezoelectric element 8 is arranged to extend in the direction (the Z-axis direction) perpendicular to the direction (the X-axis direction) of the axis of the corresponding shaft member 5. However, each piezoelectric element 8 may be arranged to extend in a direction intersecting the direction (the X-axis direction) of the axis of the corresponding shaft member 5 at an angle other than 90°. Reducing the length (height) of each piezoelectric element 8 in the Z-axis direction can reduce the length (height) of the lens holder driving device 101 in the Z-axis direction.

Further, in the above-described embodiment, the first biasing member 13A for biasing the first piezoelectric driver PD1 toward the first shaft member 5A may be provided in the first lens holder 3A as illustrated in FIG. 4. The second biasing member 13B for biasing the second piezoelectric driver PD2 toward the second shaft member 5B may be provided in the second lens holder 3B.

This configuration allows the movement (circular motion) of each piezoelectric element 8 to be reliably transmitted to the corresponding shaft member 5. More specifically, in this configuration, the movement of the first piezoelectric element 8A can be reliably transmitted to the first shaft member 5A and the movement of the second piezoelectric element 8B can be reliably transmitted to the second shaft member 5B while preventing interference between the respective movements of the first piezoelectric element 8A and the second piezoelectric element 8B.

Further, as illustrated in FIGS. 6A and 6B in the above-described embodiment, the first biasing member 13A may be made of a plate-shaped metal member such as a flat spring and include first fixing portions (the front fixing portion 13FF and the rear fixing portion 13FB) which are fixed to the first lens holder 3A, two first support portions (the upper support portion 13SU and the lower support portion 13SD) for supporting two locations (the first node ND1 and the second node ND2) which are spaced apart from each other on one side (the Y1 side) of the first piezoelectric driver PD1, and two first elastic deforming portions (the upper elastic deforming portion 13EU and the lower elastic deforming portion 13ED) which are capable of being elastically deformed and are provided between the first fixing portions (the front fixing portion 13FF and rear fixing portion 13FB) and the two first support portions (the upper support portion 13SU and the lower support portion 13SD). In this case, as illustrated in FIG. 6A, the first shaft member 5A may be in contact with the other side (the Y2 side) of the first piezoelectric driver PD1 (the first contact member 9A) in a space between the two first support portions (the upper support portion 13SU and the lower support portion 13SD). In a similar manner, as illustrated in FIG. 5, the second biasing member 13B may be made of a plate-shaped metal member such as a flat spring, and may include second fixing portions (the front fixing portion 13FF and the rear fixing portion 13FB) which are fixed to the second lens holder 3B, two second support portions (the upper support portion 13SU and the lower support portion 13SD) for supporting two locations spaced apart from each other on one side (the Y2 side) of the second piezoelectric driver PD2, and two second elastic deforming portions (the upper elastic deforming portion 13EU and the lower elastic deforming portion 13ED) which are capable of being elastically deformed and are provided between the second fixing portions (the front fixing portion 13FF and the rear fixing portion 13FB) and the two second support portions (the upper support portion 13SU and the lower support portion 13SD). In this case, the second shaft member 5B may be in contact with the other side (the Y1 side) of the second piezoelectric driver PD2 (the second contact member 9B) in a space between the two second support portions (the upper support portion 13SU and the lower support portion 13SD).

This configuration can prevent each biasing member 13 from obstructing the movement (circular motion) of the corresponding piezoelectric element 8. This is because the areas near the two nodes of each piezoelectric element 8, which vibrates (moves in a circular motion), are supported by the corresponding biasing member 13.

In addition, in the above-described embodiment, as illustrated in FIG. 4, the first piezoelectric driver PD1 may be provided on the outside (the Y1 side) of the first shaft member 5A away from the second shaft member 5B, and the second piezoelectric driver PD2 may be provided on the outside (the Y2 side) of the second shaft member 5B away from the first shaft member 5A.

This configuration can improve the manufacturing productivity of the lens holder driving device 101. This is because the piezoelectric driver PD can be attached easily to the lens holder 3 compared to a case in which the piezoelectric driver PD provided on the inner side of the shaft member 5.

In addition, in the above-described embodiment, as illustrated in FIG. 4, the first magnet (the first moving magnet 4A) may be provided in the first lens holder 3A. In this case, the first magnetic member that exerts a magnetic attraction force in the direction (the Z-axis direction) intersecting the optical-axis direction may be provided between the fixed member FB (the base member 2) and the first magnet (the first moving magnet 4A) over the entire range of movement of the first lens holder 3A. Further, as illustrated in FIG. 4, the second magnet (the second moving magnet 4B) may be provided in the second lens holder 3B. In this case, the second magnetic member that exerts a magnetic attraction force in the direction (the Z-axis direction) intersecting the optical-axis direction may be provided between the fixed member FB (the base member 2) and the second magnet (the second moving magnet 4B) over the entire range of movement of the second lens holder 3B. In FIG. 4, the first magnetic member is the second shaft member 5B and the second magnetic member is the first shaft member 5A. However, the first magnetic member may be an unillustrated member other than the second shaft member 5B and the second magnetic member may be an unillustrated member other than the first shaft member 5A.

This configuration can restrict the rattling of the lens holders 3. In the example illustrated in FIG. 8B, the magnetic attraction force that acts between the first moving magnet 4A and the first magnetic member results in a torque (a biasing torque TQ indicated by a dash-dotted arrow) which causes the first lens holder 3A to rotate about the axis (the axis 5AX) of the first shaft member 5A. The biasing torque TQ acts to press the right bearing portion 32AR of the first lens holder 3A against the second shaft member 5B from the upper side (the Z1 side). In addition to the biasing torque TQ, a torque (dead-weight torque) from the dead weight of the first lens holder 3A acts on the first lens holder 3A to cause the first lens holder 3A to rotate about the axis (axis 5AX) of the first shaft member 5A. The first moving magnet 4A is configured such that the biasing torque TQ generated from the attraction force becomes higher than the dead-weight torque. Hence, whatever the posture of the lens holder driving device 101 may be (for example, even when the lens holder driving device 101 is turned upside down), the combined torque obtained by combining the biasing torque TQ and the dead-weight torque can constantly act to press the first right-bearing portion 32AR of the first lens holder 3A against the second shaft member 5B from the Z1 side. That is, the combined torque acts to press the first right-bearing portion 32AR of the first lens holder 3A against the second shaft member 5B from the Z1 side not only when the biasing torque TQ and the dead-weight torque are in the same direction, but also when the biasing torque TQ and the dead-weight torque are in opposite directions to each other. As a result, the first right-bearing portion 32AR of the first lens holder 3A may be kept in constant contact with the second shaft member 5B regardless of the posture of the lens holder driving device 101 (for example, even when the lens holder driving device 101 is turned upside down). Therefore, the rattling of the first right-bearing portion 32AR and the second shaft member 5B can be reduced. Rattling of the first left-bearing portion 32AL of the first lens holder 3A and the first shaft member 5A, the rattling of second left-bearing portion 32BL of the second lens holder 3B and the first shaft member 5A, and the rattling of the second right-bearing portion 32BR of the second lens holder 3B and the second shaft member 5B can similarly be reduced. Furthermore, this configuration can improve the drop impact resistance of the lens holder driving device 101.

In addition, the first magnetic member that exerts an attraction force between itself and the first magnet (the first moving magnet 4A) in the direction intersecting the optical-axis direction may be either the first shaft member 5A or the second shaft member 5B. In a similar manner, the second magnetic member that exerts an attraction force between itself and the second magnet (the second moving magnet 4B) in the direction intersecting the optical-axis direction may be the other of the first shaft member 5A or the second shaft member 5B.

In addition, in the above-described embodiment, as illustrated in FIG. 4, the first magnet (the first moving magnet 4A) may be fixed to the portion (the first right-bearing portion 32AR) near the second shaft member 5B in the first lens holder 3A. In this case, the first magnetic member may be the second shaft member 5B. The second magnet (the second moving magnet 4B) may be fixed to the portion (the second left-bearing portion 32BL) near the first shaft member 5A in the second lens holder 3B. In this case, the second magnetic member may be the first shaft member 5A.

In this configuration, the magnetic member for generating an attraction force between itself and the moving magnet 4 need not be provided separately from the shaft member 5.

Hence, this configuration can reduce the manufacturing cost of the lens holder driving device 101.

Note that in a case in which the first shaft member 5A is the first magnetic member, it is preferable to provide the first magnet (the first moving magnet 4A) in a portion, of the first lens holder 3A, which is near the first shaft member 5A. In addition, in a case in which the second shaft member 5B is the second magnetic member, it is preferable to provide the second magnet (the second moving magnet 4B) in a portion, of the second lens holder 3B, which is near the second shaft member 5B.

In addition, in the above-described embodiment, as illustrated in FIG. 4, the first piezoelectric driver PD1 may include the first contact member 9A that is made of metal and contacts the first shaft member 5A. Also, the second piezoelectric driver PD2 may include the second contact member 9B that is made of metal and contacts the second shaft member 5B. In this case, the first shaft member 5A and the second shaft member 5B may be made of a metal that is harder than that of the first contact member 9A and the second contact member 9B. That is, the first shaft member 5A and the second shaft member 5B may be made of a first metal, the first contact member 9A and the second contact member 9B may be made of a second metal, and the first metal may be harder than the second metal.

This configuration helps reduce the wear of the shaft members 5 and the contact members 9. In particular, this configuration reduces the wear of the shaft members 5 because the shaft members 5 are made of a metal which is harder than that of the contact members 9. Furthermore, this configuration can reduce the debris that is generated due to the contact between the shaft members 5 and the contact members 9, thus reducing the debris that reaches the image sensor IS.

In addition, in the above-described embodiment, as illustrated in FIGS. 11A and 11B, the portion (the first left-bearing portion 32AL) of the first lens holder 3A that is near the first shaft member 5A may include a first front wall portion FW1, in which the first front through hole THF1 where the first shaft member 5A is inserted is formed, and a first rear wall portion BW1, in which the first rear through hole THB1 where the first shaft member 5A is inserted is formed. In this case, the first piezoelectric driver PD1 may be arranged inside a first space SP1 between the first front wall portion FW1 and the first rear wall portion BW1. The first space SP1 may be covered by the first cover CV1 (see FIG. 4) which is attached to the portion (the first left-bearing portion 32AL) of the first lens holder 3A which is near the first shaft member 5A.

In a similar manner, as illustrated in FIG. 4, the portion (the second right-bearing portion 32BR) of the second lens holder 3B which is near the second shaft member 5B may include the second front wall FW2, in which a second front through hole THF2 where the second shaft member 5B is inserted is formed, and the second rear wall BW2, in which a second rear through hole THB2 where the second shaft member 5B is inserted is formed. In this case, the second piezoelectric driver PD2 may be arranged in the second space SP2 between the second front wall portion FW2 and the second rear wall portion BW2. The second space SP2 may be covered by the second cover CV2 which is attached to the portion (the second right-bearing portion 32BR) of the second lens holder 3B which is near the second shaft member 5B.

In this configuration, the debris generated due to the contact between each shaft member 5 and the corresponding contact member 9 can be confined in a sealed space. More specifically, in this configuration, the debris generated due to the contact between the first shaft member 5A and the first contact member 9A can be confined in the first space SP1 enclosed by the first left-bearing portion 32AL (the first front wall portion FW1 and the first rear wall portion BW1) and the first cover CV1. Furthermore, in this configuration, the debris generated due to the contact between the second shaft member 5B and the second contact member 9B can be confined in the second space SP2 enclosed by the second right-bearing portion 32BR (the second front wall FW2 and the second rear wall BW2) and the second cover CV2.

In addition, in the above-described embodiment, as illustrated in FIG. 3, the first magnetic field generating member MG1 and the second magnetic field generating member MG2 may be provided in the fixed member FB (the base member 2). In this case, as illustrated in FIG. 8B, the first magnetic field generating member MG1 may be arranged to face the portion (the first left-bearing portion 32AL) of the first lens holder 3A which is near the first shaft member 5A. The first magnetic sensor 6A for detecting the magnetic field from the first magnetic field generating member MG1 may be arranged near the portion (the first left-bearing portion 32AL) of the first lens holder 3A which is near the first shaft member 5A. Also, the second magnetic field generating member MG2 may be arranged to face the portion (the second right-bearing portion 32BR) of the second lens holder 3B which is near the second shaft member 5B. The second magnetic sensor 6B for detecting the magnetic field from the second magnetic field generating member MG2 may be provided in the portion (the second right-bearing portion 32BR) of the second lens holder 3B which is near the second shaft member 5B.

This configuration can suppress the magnetic interference between the first magnetic field generating member MG1 and the second magnetic field generating member MG2. The magnetic interference can be suppressed because the first magnetic field generating member MG1 and the second magnetic field generating member MG2 are provided at positions apart from each other. Hence, in this configuration, the movement of the first lens holder 3A and the movement of the second lens holder 3B can be detected more accurately.

In addition, in the above-described embodiment, as illustrated in FIG. 8A, the first magnetic field generating member MG1 may partially overlap with the second magnetic field generating member MG2 in the optical-axis direction. In FIG. 8A, the width WD1 is the length (width) of the first magnetic field generating member MG1 in the optical-axis direction, and the width WD2 is the length (width) of the second magnetic field generating member MG2 in the optical-axis direction. The first magnetic field generating member MG1 overlaps with the second magnetic field generating member MG2 over the distance DS in the optical-axis direction.

This configuration allows the sum of the length of the range of movement of the first lens holder 3A and the length of the range of movement of the second lens holder 3B to be set longer than the length of the lens holder driving device 101 in the optical-axis direction. Hence, in this configuration, it is possible to reduce the size and weight of the lens holder driving device 101 while allowing a desired range of movement to be implemented for each of the first movable member MB1 and the second movable member MB2.

In addition, in the above-described embodiment, the first lens holder 3A may include the plurality of through holes (the first front through hole RHF1, the first rear through hole RHB1, the first front through hole THF1, and the first rear through hole THB1) extending in the optical-axis direction as illustrated in FIGS. 11A and 11B. The first front through hole RHF1 may be formed by the combination of the first groove (the lower front U-shaped groove DCF) which opens upward and the second groove (the upper front U-shaped groove UCF) which opens downward. The first rear through hole RHB1 may be formed by the combination of the first groove (the lower rear U-shaped groove DCB) which opens upward and the second groove (the upper rear U-shaped groove UCB) which opens downward. The first front through hole THF1 may be formed by the combination of the first groove (the lower front U-shaped groove DLF) which opens upward and the second groove (the upper front U-shaped groove ULF) which opens downward. The first rear through hole THB1 may be formed by the combination of the first groove (the lower rear U-shaped groove DLB) which opens upward and the second groove (the upper rear U-shaped groove ULB) which opens downward. The plurality of through holes (a second front through hole RHF2, a second rear through hole RHB2, the second front through hole THF2, and the second rear through hole THB2) formed in the second lens holder 3B illustrated in FIG. 4 may be formed in a similar manner to the above-described plurality of through holes formed in the first lens holder 3A. The first semi-circle cutout CT1 formed in the first lens holder 3A illustrated in FIGS. 11A and 11B and the second semi-circle cutout CT2 formed in the second lens holder 3B illustrated in FIG. 4 can also be formed in a manner similar to the above-described plurality of through holes formed in the first lens holder 3A.

This configuration can reduce the manufacturing cost of the lens holder driving device 101. Each of the first front through hole THF1 and the first rear through hole THB1 is formed by a pair of U-shaped grooves, and the first semi-circle cutout CT1 is formed by a combination of L-shaped grooves. Hence, the first lens holder 3A can be manufactured by injection molding using a pair of dies (an upper die and a lower die) which can be separated in the vertical direction and do not include a slide core. In a similar manner, each of the second front through hole THF2 and the second rear through hole THB2 is formed by a pair of U-shaped grooves, and the second semi-circle cutout CT2 is formed by a combination of L-shaped grooves. Hence, the second lens holder 3B can be manufactured by injection molding using a pair of dies (an upper die and a lower die) which can be separated in the vertical direction and do not include a slide core. Note that since the first lens holder 3A and the second lens holder 3B are the same shape and size as illustrated in FIGS. 4, 11A, and 11B, they can be formed by the same set of molds.

An embodiment of the present disclosure has been described above. However, the present disclosure is not limited to the embodiment described above. Various modifications and substitutions can be applied without departing from the spirit and scope of the present disclosure. The features described with reference to the above-described embodiment may be appropriately combined unless they are technically inconsistent.

For example, in the above-described embodiment, the first through hole TH1 is formed by the combination of two U-shaped grooves as illustrated in FIGS. 11A and 11B. However, at least one of the U-shaped grooves may be a V-shaped groove. The first through hole RH1 (see FIGS. 11A and 11B), the second through hole TH2 (see FIG. 4), and a second through hole RH2 (see FIG. 4) may also be formed such that at least one of the U-shaped grooves may be a V-shaped groove.

In addition, in the above-described embodiment, the first moving magnet 4A is fixed to the portion near the second shaft member 5B in the first lens holder 3A. However, the first moving magnet 4A may be fixed to both the portion near the first shaft member 5A and the portion near the second shaft member 5B. The second moving magnet 4B may be formed in a similar manner. Furthermore, the first moving magnet 4A may be fixed to the portion near the second shaft member 5B in the first lens holder 3A, and the second moving magnet 4B may be fixed to the portion near the second shaft member 5B in the second lens holder 3B.

What is claimed is:

1. A lens holder driving device comprising:
a fixed member;
a first lens holder configured to hold a first lens body;
a second lens holder configured to hold a second lens body arranged to have a same optical axis as the first lens body;
a first shaft member and a second shaft member provided in the fixed member and configured to guide the first lens holder and the second lens holder to move in an optical-axis direction with respect to the fixed member;
a first piezoelectric driver including a first piezoelectric element and configured to move the first lens holder along the optical-axis direction based on movement of the first piezoelectric element; and
a second piezoelectric driver including a second piezoelectric element and configured to move the second lens holder along the optical-axis direction based on movement of the second piezoelectric element,
wherein the first lens holder includes a first portion that is positioned closer to the first shaft member than to the second shaft member and a second portion that is positioned closer to the second shaft member than to the first shaft member,
the first piezoelectric driver is provided in the first portion in the first lens holder such that the first piezoelectric driver directly contacts the first shaft member, while the first piezoelectric driver is arranged so as not to contact the second shaft member,
the second lens holder includes a third portion that is positioned closer to the first shaft member than to the second shaft member and a fourth portion that is positioned closer to the second shaft member than to the first shaft member, and
the second piezoelectric driver is provided in the fourth portion in the second lens holder such that the second piezoelectric driver directly contacts the second shaft member, while the second piezoelectric driver is arranged so as not to contact the first shaft member,
wherein the first piezoelectric element extends in a direction intersecting a direction of an axis of the first shaft member, and
the second piezoelectric element extends in a direction intersecting a direction of an axis of the second shaft member,
wherein the first lens holder includes a first biasing member configured to bias the first piezoelectric driver toward the first shaft member, and
the second lens holder includes a second biasing member configured to bias the second piezoelectric driver toward the second shaft member,
wherein the first biasing member is a plate-shaped metal member and includes:
a first fixing portion fixed to the first lens holder;
two first support portions configured to support two locations which are spaced apart from each other on one side of the first piezoelectric driver, said two first support portions being arranged to be parallel to each other; and two first elastic deforming portions capable of being elastically deformed and provided between the first fixing portion and the two first support portions, wherein the other side of the first piezoelectric driver contacts the first shaft member in a space between the two first support portions, the second biasing member is a plate-shaped metal member and includes:

a second fixing portion fixed to the second lens holder;

two second support portions configured to support two locations which are spaced apart from each other on one side of the second piezoelectric driver, said two second support portions being arranged to be parallel to each other; and two second elastic deforming portions provided between the second fixing portion and the two second support portions and capable of being elastically deformed, wherein the other side of the second piezoelectric driver contacts the second shaft member in a space between the two second support portions, the first fixing portion, the two first elastic deforming portions, and the two first support portions integrally form the first biasing member as a single piece, and the second fixing portion, the two second elastic deforming portions, and the two second support portions integrally form the second biasing member as a single piece.

2. The lens holder driving device according to claim 1, wherein the first shaft member and the second shaft member are spaced apart from each other, the first shaft member is positioned between the first piezoelectric driver and the second shaft member, and the second shaft member is positioned between the second piezoelectric driver and the first shaft member.

3. The lens holder driving device according to claim 1, wherein the first lens holder includes a first magnet, the fixed member includes a first magnetic member configured to exert an attraction force between the fixed member and the first magnet in a direction intersecting the optical-axis direction over an entire range of the movement of the first lens holder, the second lens holder includes a second magnet, and the fixed member includes a second magnetic member configured to exert an attraction force between the fixed member and the second magnet in a direction intersecting the optical-axis direction over an entire range of movement of the second lens holder.

4. The lens holder driving device according to claim 3, wherein the first magnetic member includes either the first shaft member or the second shaft member, and the second magnetic member includes the other of the first shaft member or the second shaft member.

5. The lens holder driving device according to claim 3, wherein the first magnet is fixed to the second portion in the first lens holder, the first magnetic member is the second shaft member, the second magnet is fixed to the third portion in the second lens holder, and the second magnetic member is the first shaft member.

6. The lens holder driving device according to claim 1, wherein the first piezoelectric driver includes a first contact member, which is made of a metal and is configured to contact the first shaft member, the second piezoelectric driver includes a second contact member, which is made of a metal and is configured to contact the second shaft member, and the first shaft member and the second shaft member are made of a first metal and the first contact member and the second contact member are made of a second metal, wherein the first metal is harder than the second metal.

7. The lens holder driving device according to claim 1, wherein the first portion in the first lens holder includes:

a first front wall portion, which includes a first front through-hole where the first shaft member is inserted; and a first rear wall portion, which includes a first rear through-hole where the first shaft member is inserted, the first piezoelectric driver is arranged in a first space between the first front wall portion and the first rear wall portion, the first space is covered by a first cover attached to the first portion in the first lens holder, and the fourth portion in the second lens holder includes:

a second front wall portion, which includes a second front through-hole where the second shaft member is inserted; and a second rear wall portion, which includes a second rear through-hole where the second shaft member is inserted, the second piezoelectric driver is arranged in a second space between the second front wall portion and the second rear wall portion, and the second space is covered by a second cover attached to the fourth portion in the second lens holder.

8. The lens holder driving device according to claim 1, wherein the fixed member includes a first magnetic field generating member and a second magnetic field generating member, the first magnetic field generating member faces the first portion in the first lens holder, the first portion in the first lens holder includes a first magnetic sensor configured to detect a magnetic field from the first magnetic field generating member, the second magnetic field generating member faces the fourth portion in the second lens holder, and the fourth portion in the second lens holder includes a second magnetic sensor configured to detect a magnetic field from the second magnetic field generating member.

9. The lens holder driving device according to claim 8, wherein the first magnetic field generating member partially overlaps with the second magnetic field generating member in the optical-axis direction.

10. The lens holder driving device according to claim 1, wherein each of the first lens holder and the second lens holder includes a plurality of through holes that run in the optical-axis direction, and each of the plurality of through holes is formed by a combination of a first groove which opens in a predetermined direction and a second groove which opens in a direction opposite to the predetermined direction.

11. The lens holder driving device according to claim 1, wherein each of the two first support portions includes a first recessed portion that is configured to hold the first piezoelectric driver, and each of the two second support portions includes a second recessed portion that is configured to hold the second piezoelectric driver.

* * * * *